(12) United States Patent
Saito et al.

(10) Patent No.: US 8,925,418 B2
(45) Date of Patent: Jan. 6, 2015

(54) ACCELERATOR APPARATUS FOR VEHICLE

(71) Applicant: Denso Corporation, Kariya (JP)

(72) Inventors: Takehiro Saito, Anjo (JP); Masahiro Makino, Kariya (JP)

(73) Assignee: Denso Corporation, Kariya (JP)

( * ) Notice: Subject to any disclaimer, the term of this patent is extended or adjusted under 35 U.S.C. 154(b) by 92 days.

(21) Appl. No.: 13/745,160

(22) Filed: Jan. 18, 2013

(65) Prior Publication Data

US 2013/0186228 A1    Jul. 25, 2013

(30) Foreign Application Priority Data

Jan. 23, 2012    (JP) .................................. 2012-10913

(51) Int. Cl.
*G05G 1/30* (2008.04)
*G05G 1/44* (2008.04)
*G05G 1/38* (2008.04)
*B60K 26/02* (2006.01)

(52) U.S. Cl.
CPC .. *G05G 1/44* (2013.01); *G05G 1/38* (2013.01); *B60K 26/02* (2013.01)
USPC .......................................................... 74/513

(58) Field of Classification Search
USPC ............................................. 74/512, 513, 560
See application file for complete search history.

(56) References Cited

U.S. PATENT DOCUMENTS

| 2011/0088505 | A1* | 4/2011 | Watanabe et al. | 74/513 |
| 2012/0060638 | A1* | 3/2012 | Saito et al. | 74/513 |
| 2012/0297920 | A1* | 11/2012 | Saito et al. | 74/513 |
| 2013/0087009 | A1* | 4/2013 | Stewart et al. | 74/560 |
| 2013/0160600 | A1 | 6/2013 | Saito et al. | |

FOREIGN PATENT DOCUMENTS

| JP | 2007-253869 | 10/2007 |
| JP | 2010-096217 | 4/2010 |
| JP | 2013-129293 | 7/2013 |

* cited by examiner

*Primary Examiner* — Vicky Johnson
(74) *Attorney, Agent, or Firm* — Nixon & Vanderhye P.C.

(57) ABSTRACT

A first outer wall of a boss portion has a first projection, which projects toward a first inner wall of a support member. A second outer wall of the boss portion has a second projection, which projects toward a second inner wall of the support member. The first inner wall of the support member has at least one projection, which projects toward the first outer wall. The second inner wall of the support member has at least one projection, which projects toward the second outer wall.

16 Claims, 10 Drawing Sheets

US 8,925,418 B2

ACCELERATOR APPARATUS FOR VEHICLE

CROSS REFERENCE TO RELATED APPLICATION

This application is based on and incorporates herein by reference Japanese Patent Application No. 2012-10913 filed on Jan. 23, 2012.

TECHNICAL FIELD

The present disclosure relates to an accelerator apparatus for a vehicle.

BACKGROUND

A known accelerator apparatus controls an acceleration state of a vehicle (e.g., an automobile) according to the amount of depression of an accelerator pedal, which is depressed by a foot of a driver of the vehicle. In the accelerator apparatus, a rotational angle of a shaft, which corresponds to a rotational angle of a pedal arm connected to the accelerator pedal, is sensed. In the vehicle, an opening degree of a throttle valve, which adjusts a quantity of intake air drawn into an internal combustion engine of the vehicle, is determined based on the sensed rotational angle. A return mechanism and a hysteresis mechanism are received in an interior space of a support member of the accelerator apparatus. The return mechanism urges the shaft in an accelerator-closing direction. The hysteresis mechanism makes a pedal force, which is applied to the accelerator pedal at the time of depressing the accelerator pedal, to be larger than a pedal force, which is applied to the accelerator pedal at the time of releasing the accelerator pedal. For instance, JP2007-253869A teaches the accelerator pedal apparatus, which has the hysteresis mechanism received in the interior space of the support member.

However, in the accelerator apparatus of JP2007-253869A, a communication passage, which communicates between the interior space and an exterior space of the support member and corresponds to a movable range of the pedal arm, is formed. When a foreign object enters into the interior space of the support member through the communication passage, the foreign object may possibly be caught at, for example, the return mechanism to result in malfunction of the accelerator apparatus.

SUMMARY

The present disclosure addresses the above disadvantage. According to the present disclosure, there is provided an accelerator apparatus for a vehicle, including a support member, a shaft, a rotatable body, a pedal arm, a rotational angle sensing device and an urging device. The support member is installable to a body of the vehicle. The shaft is rotatably supported by the support member. The rotatable body is rotatable integrally with the shaft in both of an accelerator-opening direction and an accelerator-closing direction, which are opposite to each other. The rotatable body has a boss portion, which is fixed to an outer wall of the shaft. The pedal arm is fixed to the rotatable body at one end portion of the pedal arm. The other end portion of the pedal arm, which is opposite from the one end portion of the pedal arm, has a depressible portion that is depressible by a driver of the vehicle in the accelerator-opening direction. The rotational angle sensing device is received in an interior space of the support member and senses a rotational angle of the shaft relative to the support member. The urging device is received in the interior space of the support member and urges the shaft in the accelerator-closing direction. The support member has a communication passage, which receives the boss portion and communicates between the interior space of the support member and an exterior space of the support member. An outer wall of the boss portion, which is generally parallel to a rotational axis of the shaft, includes a first outer wall, which is located in one circumferential side of the boss portion in the accelerator-opening direction, and a second outer wall, which is located in another circumferential side of the boss portion in the accelerator-closing direction. The first outer wall of the boss portion has a first projection that projects from the first outer wall toward a first inner wall of the support member, which is located adjacent to the first outer wall and forms the communication passage. The second outer wall of the boss portion has a second projection that projects from the second outer wall toward a second inner wall of the support member, which is located adjacent to the second outer wall and forms the communication passage. The first inner wall of the support member has at least one projection, which projects from the first inner wall toward the first outer wall of the boss portion. The second inner wall of the support member has at least one projection, which projects from the second inner wall toward the second outer wall.

BRIEF DESCRIPTION OF THE DRAWINGS

The drawings described herein are for illustration purposes only and are not intended to limit the scope of the present disclosure in any way.

DETAILED DESCRIPTION

Figure 1:
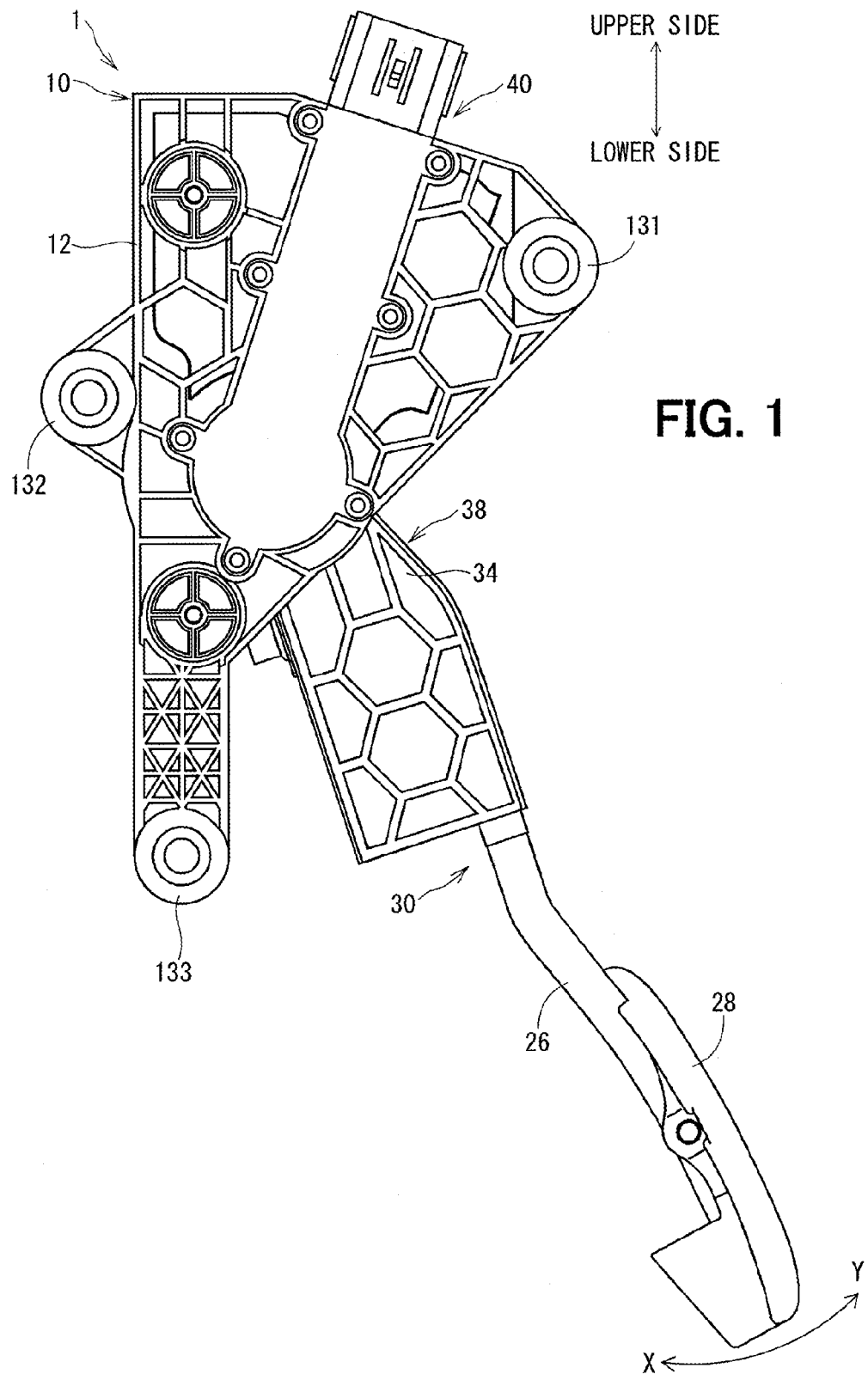
FIG. 1 is a lateral view of an accelerator apparatus according to a first embodiment of the present disclosure.

Various embodiments of the present disclosure will be described with reference to the accompanying drawings.
(First Embodiment)

FIGS. 1 to 9 show an accelerator apparatus according to a first embodiment of the present disclosure. The accelerator apparatus 1 is an input apparatus, which is manipulated by a driver of a vehicle (automobile) to determine a valve opening degree of a throttle valve of an internal combustion engine of the vehicle (not shown). The accelerator apparatus 1 is an electronic accelerator apparatus and transmits an electric signal, which indicates the amount of depression of an accelerator pedal 28, to an electronic control device. The electronic control device drives the throttle valve through a throttle actuator (not shown) based on the amount of depression of the accelerator pedal 28 and the other information.

Now, the accelerator apparatus 1 will be described with reference to FIGS. 1 to 4 and 8. FIG. 2 is a cross-sectional view taken along line II-P1-P2-II in FIG. 3.

The accelerator apparatus 1 includes a support member 10, a shaft 20, a manipulation member 30, a return spring 39, a rotational position sensor 40 and a hysteresis mechanism 50. In the following description, an upper side of FIGS. 1 to 3 will be described as an upper side of the accelerator apparatus 1, and a lower side of FIGS. 1 to 3 will be described as a lower side of the accelerator apparatus 1.

The support member 10 includes a housing 12, a first cover 16 and a second cover 18. The support member 10 forms an interior space 11, which receives the shaft 20, the return spring 39, the rotational position sensor 40 and the hysteresis mechanism 50. A communication passage 111 is formed at a lower portion of the support member 10 to communicate between the interior space 11 of the support member 10 and an exterior space of the support member 10. The communication passage 111 corresponds to a movable range of the manipulation member 30, which will be described later.

The housing 12 is made of a resin material and includes a bearing segment 13, a front segment 17, a rear segment 15 and a top segment 14. The bearing segment 13 rotatably supports one end portion 201 of the shaft 20. The front segment 17 is connected to the bearing segment 13 and is located at a front side of the accelerator apparatus 1. The rear segment 15 is opposed to the front segment 17. The top segment 14 is located at a top side of the accelerator apparatus 1 and connects between the front segment 17 and the rear segment 15. Protrusions and recesses, which are configured into a mesh pattern, are formed in an outer wall of the bearing segment 13, an outer wall of the front segment 17, an outer wall of the rear segment 15 and an outer wall of the top segment 14 to maintain the resistivity against an external force applied to the housing 12.

Figure 2:
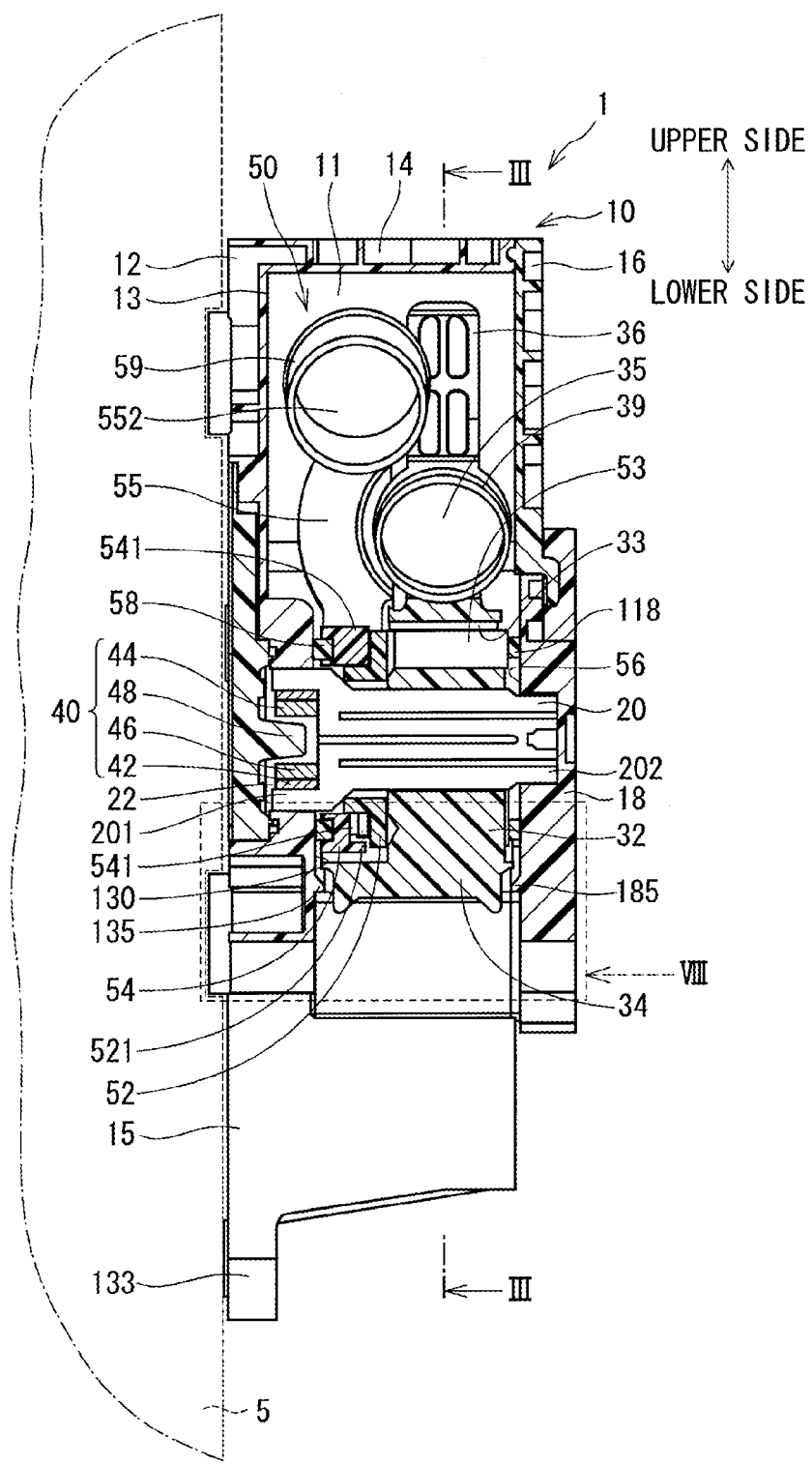
FIG. 2 is a cross-sectional view of the accelerator apparatus of the first embodiment taken from a front side of the accelerator apparatus.
Figure 3:
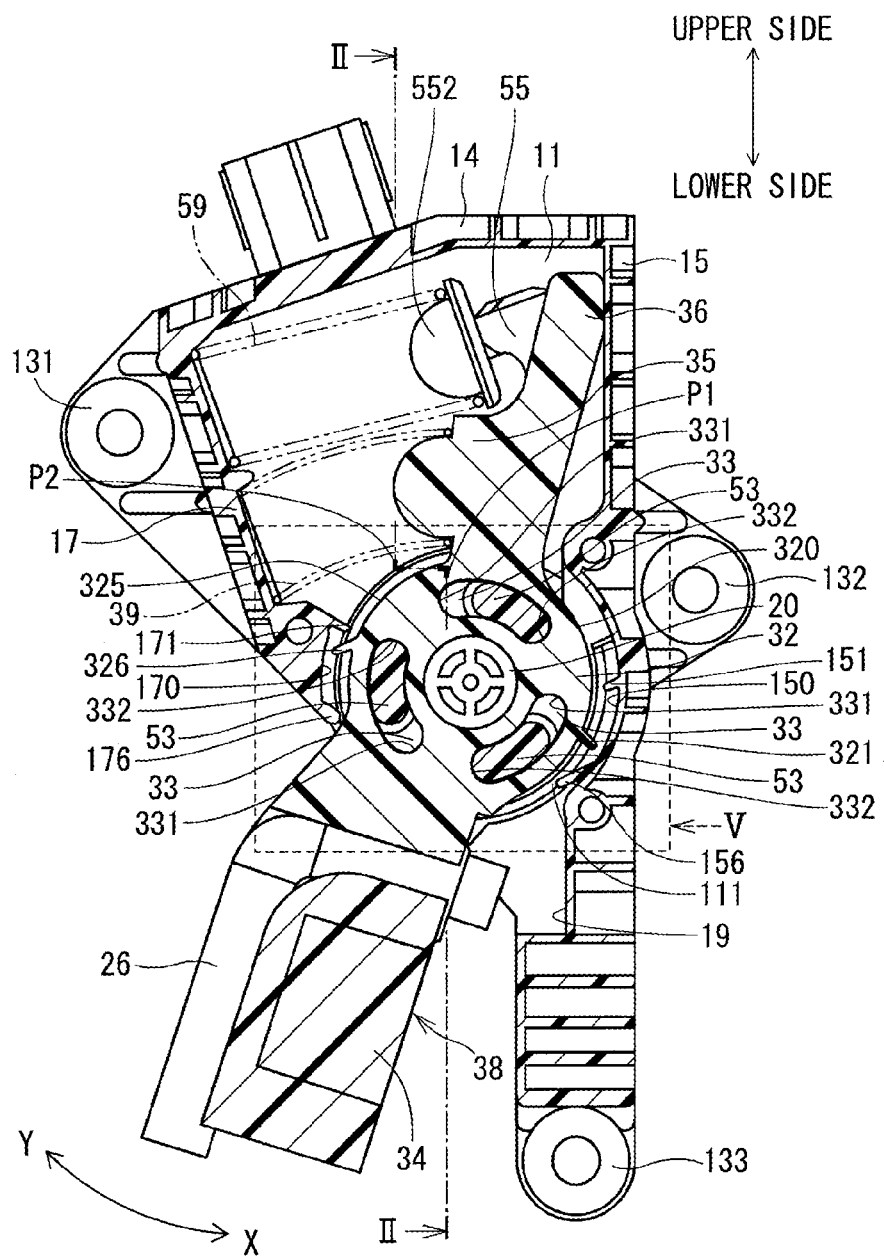
FIG. 3 is a cross sectional view taken along line III-III in FIG. 2.
Figure 4:
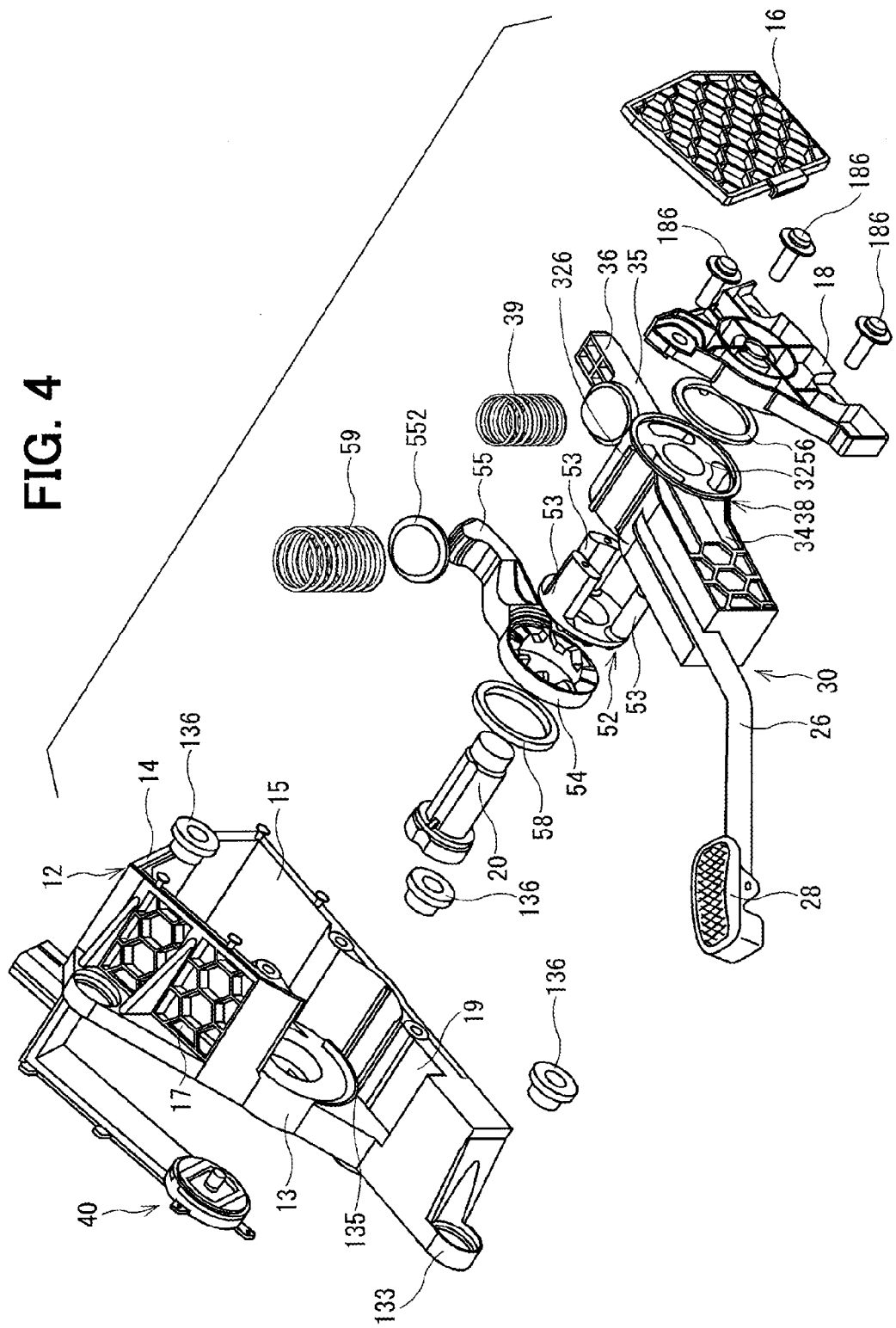
FIG. 4 is an exploded view of the accelerator apparatus of the first embodiment.

As shown in FIG. 1, attachment portions 131, 132, 133 are formed in the housing 12. A bolt hole is formed in each of the attachment portions 131, 132, 133. A washer 136 is installed to each bolt hole, and a bolt (not shown) is inserted into the bolt hole through the washer 136. The accelerator apparatus 1 is installed to a vehicle body 5 with these bolts.

A rib 135 projects from an inner wall (serving as a fourth inner wall) 130 of the bearing segment 13 toward the second cover 18 and is configured into an arcuate form. The rib 135 is formed to correspond with a width of the communication passage 111. The rib 135 projects toward the second cover 18 such that the rib 135 covers a peripheral edge part of the pedal boss portion 32, which is located on the bearing segment 13 side. The pedal boss portion 32 serves as a boss portion of the present disclosure. The rib 135 serves as an eighth projection of the present disclosure.

A full-opening-side stopper portion 19 is formed in the lower side of the rear segment 15. When the full-opening-side stopper portion 19 contacts the manipulation member 30, the full-opening-side stopper portion 19 limits rotation of the manipulation member 30 and associated members, which are rotated integrally with the manipulation member 30, at an accelerator-full-opening position. The accelerator-full-opening position is a position, at which the amount of depression of the manipulation member 30 by the driver is in the full amount, i.e., the accelerator opening degree is 100% (full opening).

The first cover 16 and the second cover 18 are opposed to the bearing segment 13 and are generally parallel to the bearing segment 13. The first cover 16 is configured into a rectangular plate form and is engaged to the second cover 18 such that the first cover 16 contacts the top segment 14, the rear segment 15 and an end portion of the front segment 17, which is opposite from the bearing segment 13 in the axial direction of the shaft 20. Protrusions and recesses, which are configured into a mesh pattern, are formed in an outer wall of the first cover 16. The first cover 16 limits intrusion of foreign objects into the interior space 11.

The second cover 18 is configured into a triangular plate form and is fixed with bolts 186 to the rear segment 15, the front segment 17 and the end portion of the front segment 17, which is opposite from the bearing segment 13 in the axial direction of the shaft 20. Protrusions and recesses, which are configured into a mesh pattern, are formed in an outer wall of the second cover 18. The second cover 18 limits intrusion of foreign objects into the interior space 11 and rotatably supports the other end portion 202 of the shaft 20, which is opposite from the one end portion 201.

A rib 185, which is configured into an arcuate form, is formed in an inner wall (serving as a third inner wall) 180 of the second cover 18 (see FIG. 8) such that the rib 185 projects toward the bearing segment 13. The rib 185 is formed to correspond with the width of the communication passage 111. The rib 185 projects toward the bearing segment 13 in the axial direction of the shaft 20 such that the rib 185 covers a peripheral edge part of the pedal boss portion 32, which is located on the second cover 18 side. The rib 185 serves as a seventh projection of the present disclosure.

The shaft 20 extends in a horizontal direction (a left-to-right direction of the vehicle) at the lower side of the accelerator apparatus 1. A sensor receiving recess 22 is formed in the one end portion 201 of the shaft 20 to receive a sensing device of the rotational position sensor 40.

The shaft 20 is rotatable through a predetermined angular range from an accelerator-full-closing position to an accelerator-full-opening position in response to a torque, which is applied from the manipulation member 30 upon depressing of the manipulation member 30 by a foot of the driver. The accelerator-full-opening position is a position, at which the amount of depression of the manipulation member 30 by the foot of the driver is in the full amount, i.e., the accelerator opening degree is 100% (full opening).

Hereinafter, the rotational direction of the manipulation member 30 and the associated members thereof from the accelerator-full-closing position toward the accelerator-full-opening position will be referred to an accelerator-opening direction X. Furthermore, the rotational direction of the manipulation member 30 and the associated members thereof from the accelerator-full-opening position toward the accelerator-full-closing position will be referred to an accelerator-closing direction Y.

The manipulation member 30 includes a rotatable body 38 and a pedal arm 26. The rotatable body 38 includes the pedal boss portion 32, an arm connecting portion 34, a spring receiving portion 35 and a full-closing-side stopper portion 36, which are formed integrally. The pedal arm 26 has the accelerator pedal 28.

The pedal boss portion 32 is configured into an annular form (i.e., a cylindrical tubular form) and is fixed to an outer wall of the shaft 20 by, for example, press-fitting 25 at an axial location between the bearing segment 13 and the second cover 18. A first outer wall 320 of the pedal boss portion 32 is generally parallel to the rotational axis of the shaft 20 and is located on the rear segment 15 side, i.e., is located in one circumferential side of the boss portion 32 in the accelerator-opening direction X. The first outer wall 320 has a first rib 321, which serves as a first projection of the present disclosure. A second outer wall 325 of the pedal boss portion 32 is generally parallel to the rotational axis of the shaft 20 and is located on the front segment 17 side, i.e., is located in another circumferential side of the boss portion 32 in the accelerator-closing direction Y. The second outer wall 325 has a second rib 326, which serves as a second projection of the present disclosure. The first rib 321 and the second rib 326 will be described in detail later.

Figure 8:
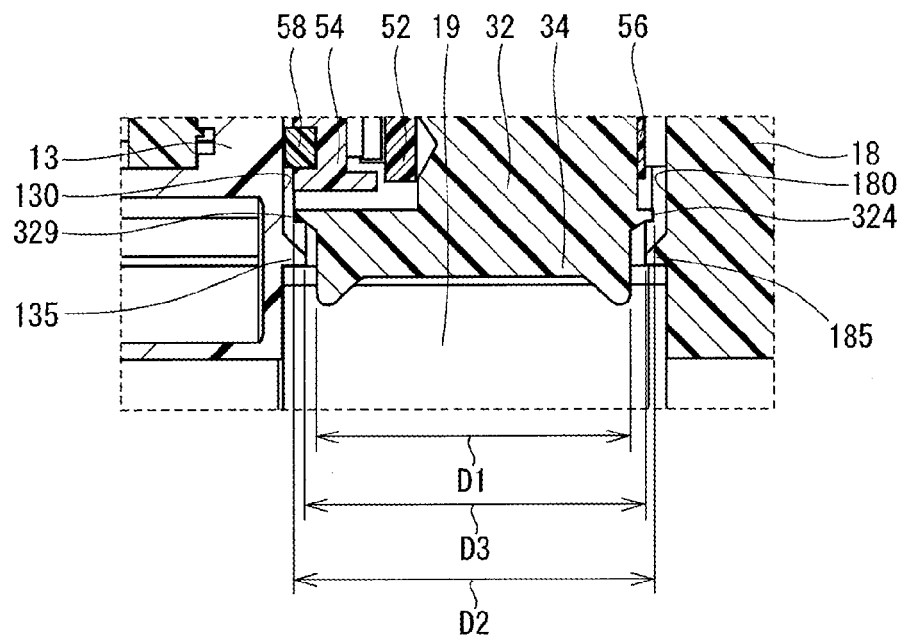
FIG. 8 is a partial enlarged view of an area VIII in FIG. 5.

One end part of the arm connecting portion 34 is connected to the pedal boss portion 32, and the other end part of the arm connecting portion 34 extends through the communication passage 111 toward the lower side. Here, as shown in FIG. 8, which is an enlarged view showing the communication passage 111 and the structure of the accelerator apparatus 1 therearound, a length D1 of the arm connecting portion 34, which is measure in the axial direction (the direction of the rotational axis) of the shaft 20, is smaller than a length D2 of the pedal boss portion 32, which is measure in the axial direction of the shaft 20. Furthermore, the length D1 of the arm connecting portion 34 is smaller than a length (distance) D3 between a distal end of the rib 135 and a distal end of the rib 185 measured in the axial direction of the shaft 20. In contrast, the length D2 of the pedal boss portion 32 is larger than the length D3.

The spring receiving portion 35 is formed to extend from the pedal boss portion 32 toward the upper side in the interior space 11. One end of the return spring 39 is engaged with the spring receiving portion 35.

The full-closing-side stopper portion 36 extends from the spring receiving portion 35 toward the upper side in the interior space 11. When the full-closing-side stopper portion 36 contacts a surface of an inner wall of the rear segment 15, which extends in the top-to-bottom direction, the rotation of the manipulation member 30 and the associated members thereof in the accelerator-closing direction Y is limited at the accelerator-full-closing position.

One end portion of the pedal arm 26 is fixed to the arm connecting portion 34, and the other end portion of the pedal arm 26 extends toward the lower side. The accelerator pedal 28 is fixed to the other end portion of the pedal arm 26. The driver of the vehicle manipulates the accelerator apparatus 1 by depressing the accelerator pedal 28. The accelerator pedal 28 converts a pedal force of the driver applied to the accelerator pedal 28 into a torque and conducts the converted torque to the shaft 20.

When the accelerator pedal 28 is rotated in the accelerator-opening direction X, a rotational angle of the shaft 20 in the accelerator-opening direction X relative to the accelerator-full-closing position, which serves as a reference point, is increased. Thereby, the accelerator opening degree, which corresponds to this rotational angle, is also increased. Furthermore, when the accelerator pedal 28 is rotated in the accelerator-closing direction Y, the rotational angle of the shaft 20 is reduced, and thereby the accelerator opening degree is reduced.

The return spring 39 is made of a coil spring, and the other end of the return spring 39 is engaged with the inner wall of the front segment 17. The return spring 39, which serves as an urging device (an urging means), urges the manipulation member 30 in the accelerator-closing direction Y. The urging force, which is exerted from the return spring 39 to the manipulation member 30, is increased when the rotational angle of the manipulation member 30, i.e., the rotational angle of the shaft 20 is increased. Furthermore, this urging force is set to enable returning of the manipulation member 30 and the shaft 20 to the accelerator-full-closing position regardless of the rotational position of the manipulation member 30.

The rotational position sensor 40 includes a yoke 42, two permanent magnets 44, 46 and a Hall element 48. The yoke 42 is made of a magnetic material and is configured into a tubular form. The yoke 42 is fixed to an inner wall of the sensor receiving recess 22 of the shaft 20. The magnets 44, 46 are placed radially inward of the yoke 42 and are fixed to the inner wall of the yoke 42 such that the magnets 44, 46 are opposed to each other about the rotational axis of the shaft 20. The Hall element 48 is placed between the magnet 44 and the magnet 46. The rotational position sensor 40 serves as a rotational angle sensing device (a rotational angle sensing means) of the present disclosure.

When a magnetic field is applied to the Hall element 48, through which an electric current flows, a voltage is generated in the Hall element 48. This phenomenon is referred to as a Hall effect. A density of a magnetic flux, which penetrates through the Hall element 48, changes when the shaft 20 and the magnets 44, 46 are rotated about the rotational axis of the shaft 20. A value of the voltage discussed above is substantially proportional to the density of the magnetic flux, which penetrates through the Hall element 48. The rotational position sensor 40 senses the relative rotational angle between the Hall element 48 and the magnets 44, 46, i.e., the relative rotational angle of the shaft 20 relative to the support member 10 by sensing the voltage, which is generated in the Hall element 48. The rotational position sensor 40 outputs an electrical signal, which indicates the sensed relative rotational angle, to the electronic control device.

The hysteresis mechanism 50 includes a first rotor 52, a second rotor 54, a first friction member 56, a second friction member 58 and a hysteresis spring 59.

The first rotor 52 is placed on a radially outer side of the shaft 20 and is axially positioned between the pedal boss portion 32 of the manipulation member 30 and the second rotor 54. The first rotor 52 is configured into an annular form (a cylindrical tubular form) and is rotatable relative to the shaft 20 and the pedal boss portion 32. Furthermore, the first rotor 52 is movable toward and away from the pedal boss portion 32 in the axial direction of the shaft 20. A plurality of projections 53 is formed integrally with the first rotor 52 on an axial side where the pedal boss portion 32 is located. A plurality of first-bevel-gear teeth 521 is formed integrally in the first rotor 52 on an axial side where the second rotor 54 is located.

Each of the projections 53 is received through a corresponding one of a plurality of through-holes 33 of the pedal boss portion 32 and projects from the pedal boss portion 32 on an axial side, which is opposite from the first rotor 52. In the present embodiment, the number of the projections 53 is three, and these three projections 53 are arranged one after another at generally equal intervals in the circumferential direction. Each of the three projections 53 is engageable with an end portion 331 of an inner wall of the corresponding one of the through holes 33 of the pedal boss portion 32.

The rotation (rotational force) can be conducted between the manipulation member 30 and the first rotor 52 through engagement between one end portion 331 of each of the through-holes 33 and the corresponding one of the projections 53 in the circumferential direction. That is, the rotation of the manipulation member 30 in the accelerator-opening direction X can be conducted to the first rotor 52 through the end portion 331 of each through-hole 33 and the corresponding projection 53. Furthermore, the rotation of the first rotor 52 in the accelerator-closing direction Y can be conducted to the manipulation member 30 through each projection 53 and the other end portion 332 of the corresponding through-hole 33, which is circumferentially opposite from the one end portion 331 of the thorough-hole 33.

The first-bevel-gear teeth 521 are formed integrally with the first rotor 52 on the axial side where the second rotor 54 is located. The first-bevel-gear teeth 521 are placed one after another at generally equal intervals in the circumferential direction. An axial projecting length of the first-bevel-gear teeth 521, which project toward the second rotor 54, circumferentially progressively increases in the accelerator-closing direction Y. Furthermore, a sloped surface is formed in a distal end part of each of the first-bevel-gear teeth 521 such that the sloped surface of each of the first-bevel-gear teeth 521 progressively approaches the second rotor 54 in the accelerator-closing direction Y.

The second rotor 54 is located radially outward of the shaft 20 and is axially placed between the first rotor 52 and the bearing segment 13 of the support member 10. The second rotor 54 is configured into an annular form (a cylindrical tubular form) and is rotatable relative to the shaft 20 and the first rotor 52. Furthermore, the second rotor 54 is movable toward and away from the bearing segment 13 of the support member 10 in the axial direction of the shaft 20. A plurality of second-bevel-gear teeth 541 is formed in the second rotor 54 on an axial side where the first rotor 52 is located.

The second-bevel-gear teeth 541 are formed integrally with the second rotor 54 on the axial side where the first rotor 52 is located. The second-bevel-gear teeth 541 are placed one after another at generally equal intervals in the circumferential direction. An axial projecting length of the second-bevel-gear teeth 541, which project toward the first rotor 52, circumferentially progressively increases in the accelerator-opening direction X. Furthermore, a sloped surface is formed in a distal end part of each of the second-bevel-gear teeth 541 such that the sloped surface of each of the second-bevel-gear teeth 541 progressively approaches the first rotor 52 in the accelerator-opening direction X.

When each of the first-bevel-gear teeth 521 contacts the corresponding one of the second-bevel-gear teeth 541 in the circumferential direction, the rotation can be transmitted between the first rotor 52 and the second rotor 54 through the contact between the sloped surface of each of the first-bevel-gear teeth 521 and the sloped surface of the corresponding one of the second-bevel-gear teeth 541. Specifically, the rotation of the first rotor 52 in the accelerator-opening direction X can be conducted to the second rotor 54 through the first-bevel-gear teeth 521 and the second-bevel-gear teeth 541. Furthermore, the rotation of the second rotor 54 in the accelerator-closing direction Y can be conducted to the first rotor 52 through the second-bevel-gear teeth 541 and the first-bevel-gear teeth 521.

Furthermore, when the rotational position of the first rotor 52 is on the circumferential side of the accelerator-full-closing position of the first rotor 52, at which the accelerator-full-opening position of the first rotor 52 is located, the sloped surface of each of the first-bevel-gear teeth 521 engages the sloped surface of the corresponding one of the second-bevel-gear teeth 541 to urge the first rotor 52 and the second rotor 54 away from each other in the axial direction of the shaft 20. When the rotational angle of the first rotor 52 from the accelerator-full-closing position of the first rotor 52 toward the accelerator-full-opening position of the first rotor 52 is increased, the urging force of the first-bevel-gear teeth 521, which urges the first rotor 52 toward the pedal boss portion 32 in the axial direction of the shaft 20, is increased. Furthermore, when the rotational angle of the first rotor 52 from the accelerator-full-closing position of the first rotor 52 toward the accelerator-full-opening position of the first rotor 52 is increased, the urging force of the second-bevel-gear teeth 541, which urges the second rotor 54 toward the bearing segment 13 of the support member 10 in the axial direction of the shaft 20, is increased.

The first friction member 56 is located radially outward of the shaft 20 and is placed between the projections 53 and the second cover 18 in the axial direction of the shaft 20. The first friction member 56 is configured into an annular form (a circular disk form) and is fixed to the second cover 18. When the first rotor 52 is axially urged in the direction away from the second rotor 54, the projections 53 are urged by the first rotor 52 against the first friction member 56 and are thereby frictionally engaged with the first friction member 56. A frictional force between each projection 53 and the first friction member 56 acts as a rotational resistance of the projection 53. When the urging force, which is applied to the first rotor 52 toward the pedal boss portion 32, is increased, a resistance torque, which is applied to the projections 53 from the first friction member 56, is increased.

The second friction member 58 is located radially outward of the shaft 20 and is placed between the second rotor 54 and the bearing segment 13 in the axial direction of the shaft 20. The second friction member 58 is configured into an annular form (a circular disk form) and is fixed to the bearing segment 13. When the second rotor 54 is urged away from the first rotor 52 in the axial direction of the shaft 20, the second rotor 54 is frictionally engaged with the second friction member 58. The frictional force between the second rotor 54 and the second friction member 58 acts as a rotational resistance of the second rotor 54. When the urging force, which is axially applied to the second rotor 54 toward the bearing segment 13, is increased, a resistance torque, which is applied to the second rotor 54 from the second friction member 58, is increased. The resistance torque, which is applied to the second rotor 54, is conducted to the projections 53 through the second-bevel-gear teeth 541, the first-bevel-gear teeth 521 and the first rotor 52.

The hysteresis spring 59 is a coil spring. One end of the hysteresis spring 59 is engaged to the spring receiving member 552, which is engaged to a spring engaging portion 55 that is formed to extend upward from the second rotor 54 in the interior space 11, and the other end of the hysteresis spring 59 is engaged with the front segment 17. The hysteresis spring 59 urges the second rotor 54 in the accelerator-closing direction Y. The urging force of the hysteresis spring 59 increases when the rotational angle of the second rotor 54 in the accelerator-opening direction X is increased. The torque, which is exerted by the urging force of the hysteresis spring 59 against the second rotor 54, is conducted to the projections 53 through the second-bevel-gear teeth 541, the first-bevel-gear teeth 521 and the first rotor 52.

Figure 5:
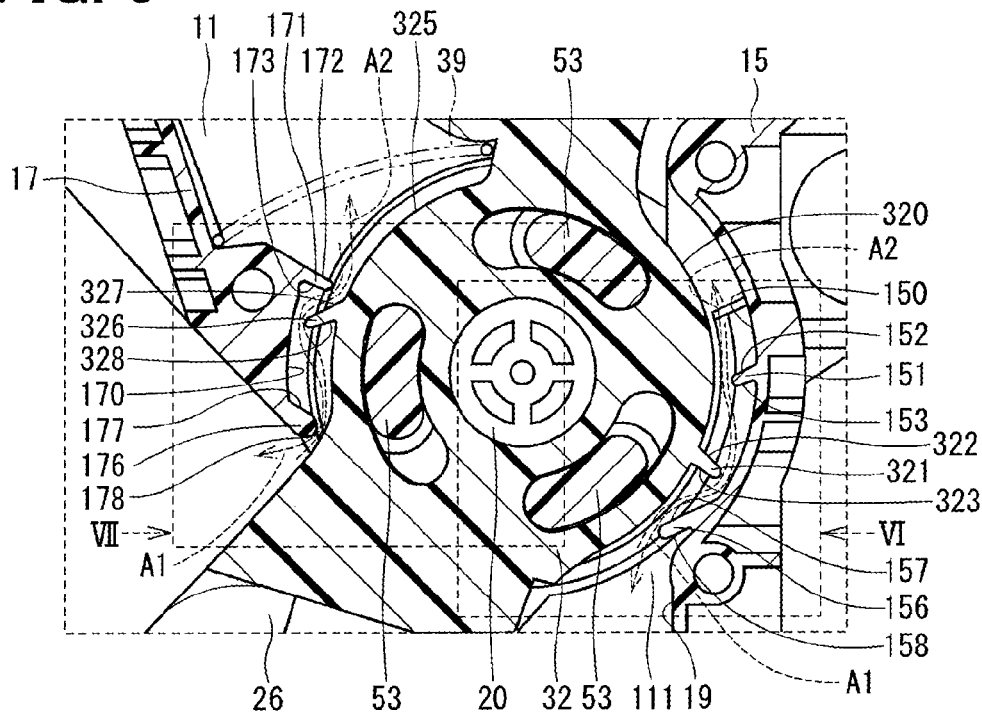
FIG. 5 is a partial enlarged view showing an area V in FIG. 3.

The accelerator apparatus 1 of the first embodiment is characterized by configurations of the first and second outer walls 320, 325 of the pedal boss portion 32, an inner wall 150 of the rear segment 15 and an inner wall 170 of the front segment 17. The inner wall 150 of the rear segment 15 serves as a first inner wall and is located adjacent to the first outer wall 320 of the pedal boss portion 32. The inner wall 170 of the front segment 17 serves as a second inner wall and is located adjacent to the second outer wall 325 of the pedal boss portion 32. The above features of the first embodiment will be described in detail with reference to FIGS. 5 to 7. In FIG. 5, a flow of the air, which flows from the interior space 11 to the exterior space of the support member 10 through a gap between the first outer wall 320 and the inner wall 150 as well as a gap between the second outer wall 325 and the inner wall 170, is indicated by a dotted line A1. Furthermore, a flow of the air, which flows from the exterior space of the support member 10 into the interior space 11 of the support member 10 through the gap between the first outer wall 320 and the inner wall 150 as well as the gap between the second outer wall 325 and the inner wall 170, is indicated by a dotted line A2.

The first rib 321 is formed in the first outer wall 320 such that the first rib 321 projects from the first outer wall 320 toward the inner wall 150. Furthermore, the second rib 326 is formed in the second outer wall 325 such that the second rib 326 projects from the second outer wall 325 toward the inner wall 170. The first rib 321 and the second rib 326 are formed to extend generally parallel to the rotational axis of the pedal boss portion 32, i.e., the rotational axis of the shaft 20. A length of the first rib 321 and a length of the second rib 326, which are measured in the direction of the rotational axis of the pedal boss portion 32, are generally the same as a length of the pedal boss portion 32, which is measured in the direction of the rotational axis of the pedal boss portion 32.

A third rib 151 and a fourth rib 156 are formed in the inner wall 150 such that the third rib 151 and the fourth rib 156 project from the inner wall 150 toward the first outer wall 320. The third rib 151 and the fourth rib 156 are formed to extend generally parallel to the rotational axis of the pedal boss portion 32. A length of the third rib 151 and a length of the fourth rib 156, which are measured in the direction of the rotational axis of the pedal boss portion 32, are generally the same as the length of the first rib 321, which is measured in the direction of the rotational axis of the pedal boss portion 32. The third rib 151 serves as a projection of the first inner wall or a third projection of the present disclosure. The fourth rib 156 serves as a projection of the first inner wall or a fourth projection of the present disclosure.

A fifth rib 171 and a sixth rib 176 are formed in the inner wall 170 such that the fifth rib 171 and the sixth rib 176 project from the inner wall 170 toward the second outer wall 325. The fifth rib 171 and the sixth rib 176 are formed to extend generally parallel to the rotational axis of the pedal boss portion 32. A length of the fifth rib 171 and a length of the sixth rib 176, which are measured in the direction of the rotational axis of the pedal boss portion 32, are generally the same as the length of the second rib 326, which is measured in the direction of the rotational axis of the pedal boss portion 32. The fifth rib 171 serves as a projection of the second inner wall or a fifth projection of the present disclosure. The sixth rib 176 serves as a projection of the second inner wall or a sixth projection of the present disclosure.

Figure 6:
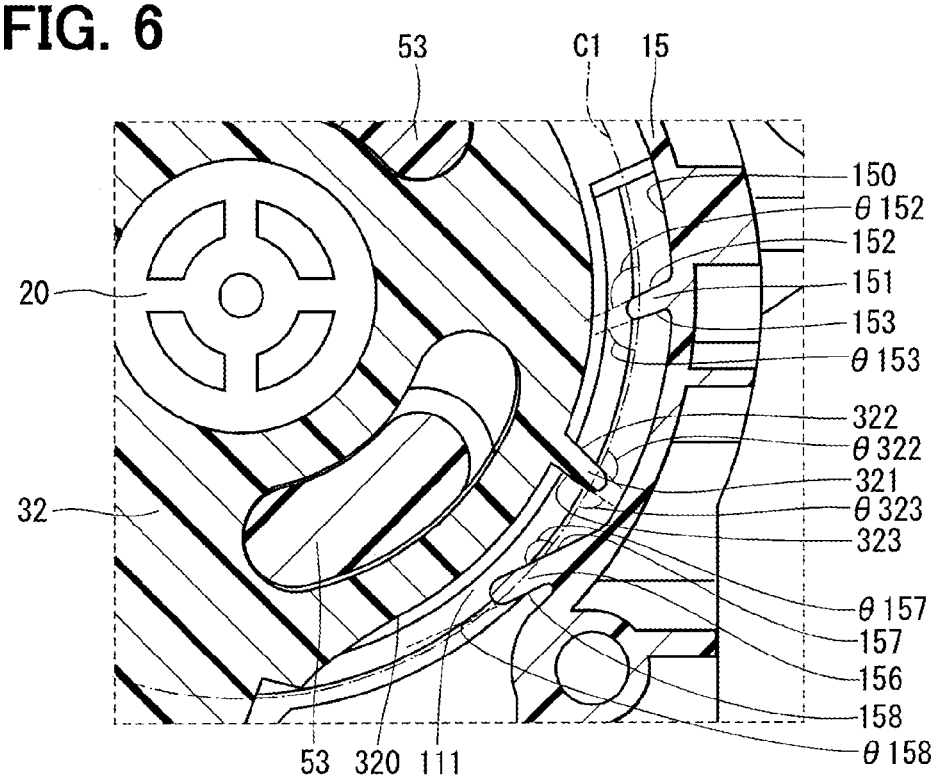
FIG. 6 is a partial enlarged view showing an area VI in FIG. 5.

Hereinafter, with reference to FIG. 6, a first imaginary line C1 is used to describe detailed configurations of the first rib 321, the third rib 151 and the fourth rib 156. As shown in FIG. 6, the first imaginary line C1 is an imaginary line that is spaced from the first outer wall 320 of the boss portion 32 by a predetermined distance on a radially outer side of the first outer wall 320 along the entire circumferential extent of the first outer wall 320. The pedal boss portion 32 of the first embodiment is configured into the cylindrical form, so that the first imaginary line C1 is an arcuate imaginary line, which has a center of the arc at the rotational axis of the shaft 20. Here, the first imaginary line C1 extends through a distal end part of the first rib 321, a distal end part of the third rib 151 and a distal end part of the fourth rib 156. That is, the first rib 321, the third rib 151 and the fourth rib 156 are partially overlapped with each other in the circumferential direction of the pedal boss portion 32. In other words, a radial extent of the first rib 321 measured in a radial direction of the shaft 20, a radial extent of the third rib 151 measured in the radial direction of the shaft 20 and a radial extent of the fourth rib 156 measured in the radial direction of the shaft 20 partially overlap with each other.

The first rib 321 includes a surface 322, which is located on an interior space 11 side in the circumferential direction, and a surface 323, which is located on an exterior space side in the circumferential direction. The interior space 11 side is a circumferential side where the interior space 11 is located. The exterior space side is a circumferential side where the exterior space of the support member 10 is located, more specifically a circumferential side where an opening of the communication passage 111, which is opened to the exterior space of the support member 10, is located. Here, an angle θ322, which is defined between the surface 322 and the first imaginary line C1 (or a tangent line that is tangent to the first imaginary line C1 at an intersecting point of the first imaginary line C1 with the surface 322 or an imaginary extension surface of the surface 322) on the radially outer side of the first imaginary line C1, is an obtuse angle. Furthermore, an angle θ323, which is defined between the surface 323 and the first imaginary line C1 (or a tangent line that is tangent to the first imaginary line C1 at an intersecting point of the first imaginary line C1 with the surface 323 or an imaginary extension surface of the surface 323) on the radially outer side of the first imaginary line C1, is an acute angle. In FIG. 6, the imaginary extension surface of the surface 322 and the imaginary extension surface of the surface 323 are indicated by a dotted line for the purpose of indicating the angle θ322 between the surface 322 and the first imaginary line C1 and the angle θ323 between the surface 323 and the first imaginary line C1. The surface 323 serves as a first exterior side surface of the present disclosure. The surface 322 serves as a first interior side surface of the present disclosure.

The third rib 151 includes a surface 152, which is located on the interior space 11 side in the circumferential direction, and a surface 153, which is located on the exterior space side in the circumferential direction. Here, an angle θ152, which is defined between the surface 152 and the first imaginary line C1 (or a tangent line that is tangent to the first imaginary line C1 at an intersecting point of the first imaginary line C1 with the surface 152 or an imaginary extension surface of the surface 152) on the radially inner side of the first imaginary line C1, is an obtuse angle. Furthermore, an angle θ153, which is defined between the surface 153 and the first imaginary line C1 (or a tangent line that is tangent to the first imaginary line C1 at an intersecting point of the first imaginary line C1 with the surface 153 or an imaginary extension surface of the surface 153) on the radially inner side of the first imaginary line C1, is an acute angle. In FIG. 6, the imaginary extension surface of the surface 152 and the imaginary extension surface of the surface 153 are indicated by a dotted line for the purpose of indicating the angle θ152 between the surface 152 and the first imaginary line C1 and the angle θ153 between the surface 153 and the first imaginary line C1. The surface 153 serves as a third exterior side surface of the present disclosure. The surface 152 serves as a third interior side surface of the present disclosure.

The fourth rib 156 includes a surface 157, which is located on the interior space 11 side in the circumferential direction, and a surface 158, which is located on the exterior space side in the circumferential direction. Here, an angle θ157, which is defined between the surface 157 and the first imaginary line C1 (or a tangent line that is tangent to the first imaginary line C1 at an intersecting point of the first imaginary line C1 with the surface 157 or an imaginary extension surface of the surface 157) on the radially inner side of the first imaginary line C1, is an obtuse angle. Furthermore, an angle θ158, which is defined between the surface 158 and the first imaginary line C1 (or a tangent line that is tangent to the first imaginary line C1 at an intersecting point of the first imaginary line C1 with the surface 158 or an imaginary extension surface of the surface 158) on the radially inner side of the first imaginary line C1, is an acute angle. In FIG. 6, the imaginary extension surface of the surface 158 is indicated by a dotted line for the purpose of indicating the angle θ158 between the surface 158 and the first imaginary line C1. The surface 158 serves as a third exterior side surface of the present disclosure. The surface 157 serves as a third interior side surface of the present disclosure.

The fourth rib 156 is formed in a lower end portion of the inner wall 150, and the lower part of the pedal boss portion 32 is exposed from the communication passage 111 to the exterior space of the support member 10.

Furthermore, each of the third rib 151 and the fourth rib 156 are formed in the corresponding location of the inner wall 150, at which the third rib 151 or the fourth rib 156 does not contact the first rib 321 even upon rotation of the pedal boss portion 32. More specifically, when the manipulation member 30 is placed in the accelerator-full-closing position thereof, the fourth rib 156 is located on the exterior space side of the first rib 321 in the circumferential direction. Furthermore, when the manipulation member 30 is rotated to the accelerator-full-opening position thereof in response to the depression of the accelerator pedal 28 by the foot of the driver, the third rib 151 is located on the interior space 11 side of the first rib 321 in the circumferential direction.

Figure 7:
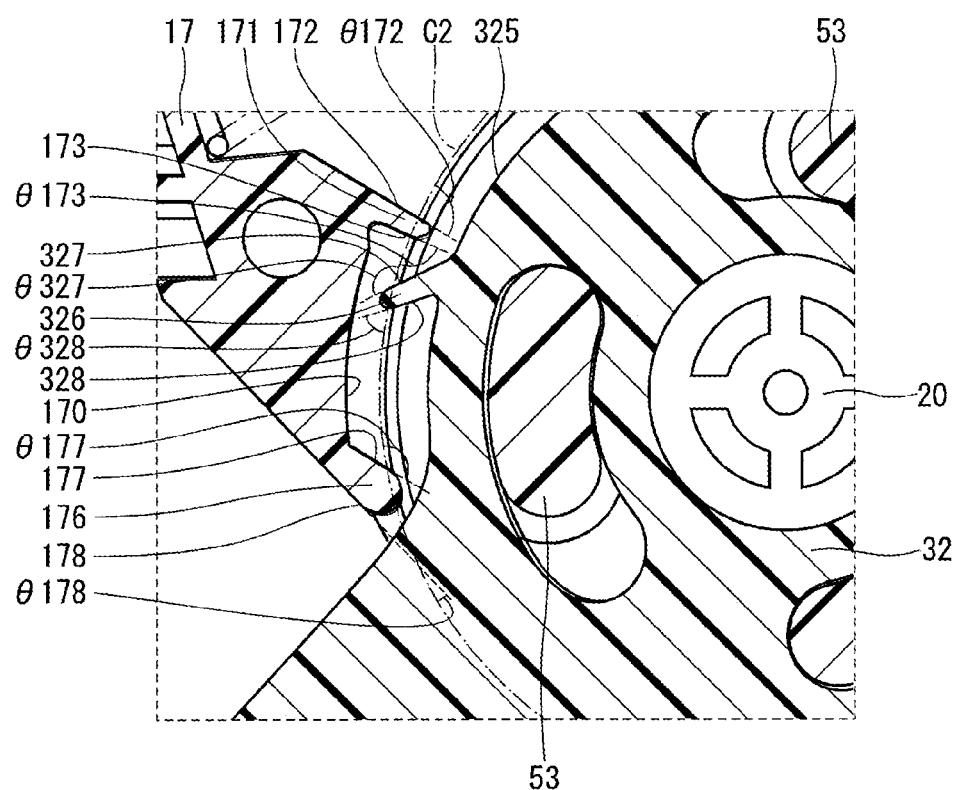
FIG. 7 is a partial enlarged view of an area VII in FIG. 5.

Hereinafter, with reference to FIG. 7, a second imaginary line C2 is used to describe detailed configurations of the second rib 326, the fifth rib 171 and the sixth rib 176. As shown in FIG. 7, the second imaginary line C2 is an imaginary line that is spaced from the second outer wall 325 of the boss portion 32 by a predetermined distance on a radially outer side of the second outer wall 325 along the entire circumferential extent of the second outer wall 325. The pedal boss portion 32 of the first embodiment is configured into the cylindrical form, so that the second imaginary line C2 is an arcuate imaginary line, which has a center of the arc at the rotational axis of the shaft 20. Here, the second imaginary line C2 extends through a distal end part of the second rib 326, a distal end part of the fifth rib 171 and a distal end part of the sixth rib 176. That is, the second rib 326, the fifth rib 171 and the sixth rib 176 are partially overlapped with each other in the circumferential direction of the pedal boss portion 32. In other words, a radial extent of the second rib 326 measured in the radial direction of the shaft 20, a radial extent of the fifth rib 171 measured in the radial direction of the shaft 20 and a radial extent of the sixth rib 176 measured in the radial direction of the shaft 20 partially overlap with each other.

The second rib 326 includes a surface 327, which is located on the interior space 11 side in the circumferential direction, and a surface 328, which is located on the exterior space side in the circumferential direction. Here, an angle θ327, which is defined between the surface 327 and the second imaginary line C2 (or a tangent line that is tangent to the second imaginary line C2 at an intersecting point of the second imaginary line C2 with the surface 327 or an imaginary extension surface of the surface 327) on the radially outer side of the second imaginary line C2, is an obtuse angle. Furthermore, an angle θ328, which is defined between the surface 328 and the second imaginary line C2 (or a tangent line that is tangent to the second imaginary line C2 at an intersecting point of the second imaginary line C2 with the surface 328 or an imaginary extension surface of the surface 328) on the radially outer side of the first imaginary line C1, is an acute angle. In FIG. 7, the imaginary extension surface of the surface 327 and the imaginary extension surface of the surface 328 are indicated by a dotted line for the purpose of indicating the angle θ327 between the surface 327 and the second imaginary line C2 and the angle θ328 between the surface 328 and the second imaginary line C2. The surface 328 serves as a second exterior side surface of the present disclosure. The surface 327 serves as a second interior side surface of the present disclosure.

The fifth rib 171 includes a surface 172, which is located on the interior space 11 side in the circumferential direction, and a surface 173, which is located on the exterior space side in the circumferential direction. Here, an angle θ172, which is defined between the surface 172 and the second imaginary line C2 (or a tangent line that is tangent to the second imaginary line C2 at an intersecting point of the second imaginary line C2 with the surface 172 or an imaginary extension surface of the surface 172) on the radially inner side of the second imaginary line C2, is an obtuse angle. Furthermore, an angle θ173, which is defined between the surface 173 and the second imaginary line C2 (or a tangent line that is tangent to the second imaginary line C2 at an intersecting point of the second imaginary line C2 with the surface 173 or an imaginary extension surface of the surface 173) on the radially inner side of the second imaginary line C2, is an acute angle. In FIG. 7, the imaginary extension surface of the surface 172 and the imaginary extension surface of the surface 173 are indicated by a dotted line for the purpose of indicating the angle θ172 between the surface 172 and the second imaginary line C2 and the angle θ173 between the surface 173 and the second imaginary line C2. The surface 173 serves as a fifth exterior side surface of the present disclosure. The surface 172 serves as a fourth interior side surface of the present disclosure.

The sixth rib 176 includes a surface 177, which is located on the interior space 11 side in the circumferential direction, and a surface 178, which is located on the exterior space side in the circumferential direction. Here, an angle θ177, which is defined between the surface 177 and the second imaginary line C2 (or a tangent line that is tangent to the second imaginary line C2 at an intersecting point of the second imaginary line C2 with the surface 177 or an imaginary extension surface of the surface 177) on the radially inner side of the second imaginary line C2, is an obtuse angle. Furthermore, an angle θ178, which is defined between the surface 178 and the second imaginary line C2 (or a tangent line that is tangent to the second imaginary line C2 at an intersecting point of the second imaginary line C2 with the surface 178 or an imaginary extension surface of the surface 178) on the radially inner side of the second imaginary line C2, is an acute angle. In FIG. 7, the imaginary extension surface of the surface 177 and the imaginary extension surface of the surface 178 are indicated by a dotted line for the purpose of indicating the angle θ177 between the surface 177 and the second imaginary line C2 and the angle θ178 between the surface 178 and the second imaginary line C2. The surface 178 serves as a fifth exterior side surface of the present disclosure. The surface 177 serves as a fifth interior side surface of the present disclosure.

Furthermore, each of the fifth rib 171 and the sixth rib 176 are formed in the corresponding location of the inner wall 170, at which the fifth rib 171 or the sixth rib 176 does not contact the second rib 326 even upon rotation of the pedal boss portion 32. More specifically, when the manipulation member 30 is placed in the accelerator-full-closing position thereof, the sixth rib 176 is located on the exterior space side of the second rib 326 in the circumferential direction. Furthermore, when the manipulation member 30 is rotated to the accelerator-full-opening position thereof in response to the depression of the accelerator pedal 28 by the foot of the driver, the fifth rib 171 is located on the interior space 11 side of the second rib 326 in the circumferential direction.

Next, the operation of the accelerator apparatus 1 will be described with reference to FIG. 9.

When the accelerator pedal 28 is depressed by the foot of the driver, the manipulation member 30 is rotated together with the shaft 20 in the accelerator-opening direction X about the rotational axis of the shaft 20 in response to the pedal force of the driver applied to the accelerator pedal 28. At this time, in order to rotate the manipulation member 30 and the shaft 20, there is required a pedal force, which is larger than a sum of a torque, which is exerted by the urging force of the return spring 39 and the urging force of the hysteresis spring 59, and a resistance torque, which is exerted by the frictional force of the first friction member 56 and the frictional force of the second friction member 58.

When the accelerator pedal 28 is depressed, the resistance torque, which is exerted by the frictional force of the first friction member 56 and the frictional force of the second friction member 58, acts to limit the rotation of the accelerator pedal 28 in the accelerator-opening direction X. Therefore, with reference to FIG. 9, the pedal force F (N) at the time of depressing the accelerator pedal 28 (see a solid line S1, which indicates the relationship between the pedal force F (N) and the rotational angle θ (degrees) at the time of depressing the accelerator pedal 28) is larger than the pedal force F (N) at the time of returning the accelerator pedal 28 toward the accelerator-full-closing position (see a dot-dash line S3, which indicates the relationship between the pedal force F (N) and the rotational angle θ (degrees) at the time of returning the accelerator pedal 28 toward the accelerator-full-closing position) even for the same rotational angle θ.

In order to maintain the depressed state of the accelerator pedal 28, it is only required to apply the pedal force that generates the torque, which is larger than a difference between the torque generated by the urging forces of the return spring 39 and the hysteresis spring 59 and the resistance torque generated by the frictional forces of the first and second friction members 56, 58. In other words, when the driver wants to maintain the depressed state of the accelerator pedal 28 after depressing the accelerator pedal 28, the driver may reduce the applied pedal force by a certain amount.

Figure 9:
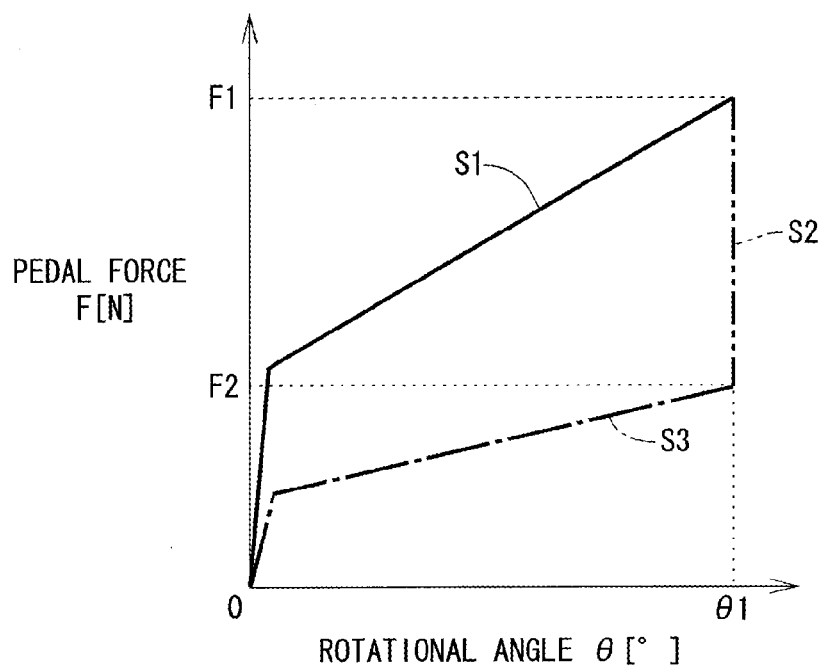
FIG. 9 is a diagram for describing a hysteresis mechanism of the accelerator apparatus of the first embodiment.

For example, as indicated by a dot-dot-dash line S2 in FIG. 9, in the case where the depressed state of the accelerator pedal 28, which is depressed to the rotational angle θ1, needs to be maintained, the pedal force may be reduced from the pedal force F1 to the pedal force F2. In this way, the depressed state of the accelerator pedal 28 can be easily maintained. The resistance torque, which is generated by the frictional forces of the first and second friction members 56, 58, is exerted to limit the rotation of the accelerator pedal 28 in the accelerator-closing direction Y at the time of maintaining the depressed state of the accelerator pedal 28.

In order to return the accelerator pedal 28 to the accelerator-full-closing position, the pedal force applied to the accelerator pedal 28 should generate a torque that is smaller than the difference between the torque, which is generated by the urging forces of the return spring 39 and the hysteresis spring 59, and the resistance torque, which is generated by the frictional forces of the first and second friction members 56, 58. Here, at the time of returning the accelerator pedal 28 to the accelerator-full-closing position, it is only required to stop the depressing of the accelerator pedal 28 (i.e., required to fully release the accelerator pedal 28). Therefore, there is no burden to the driver. In contrast, when the accelerator pedal 28 is gradually returned toward the accelerator-full-closing position, it is required to apply a predetermined pedal force on the accelerator pedal 28. In the first embodiment, the pedal force, which is required to gradually return the accelerator pedal toward the accelerator-full-closing position, is relatively small.

For example, as indicated by the dot-dash line S3 in FIG. 9, in the case where the accelerator pedal 28, which is depressed to the rotational angle θ1, is gradually returned toward the accelerator-full-closing position, the pedal force may be adjusted between the pedal force F2 and θ (zero). The pedal force F2 is smaller than the pedal force F1. Therefore, when the depressed accelerator pedal 28 is returned toward the accelerator-full closing position, the burden on the driver is reduced. The resistance torque, which is exerted by the frictional forces of the first and second friction members 56, 58, acts to limit the rotation of the accelerator pedal 28 in the accelerator-closing direction Y at the time of returning the accelerator pedal 28 toward the accelerator-full closing position. Therefore, as indicated in FIG. 9, the pedal force F at the time of returning the accelerator pedal 28 toward the accelerator-full-closing position (see the dot-dash line S3, which indicates the relationship between the pedal force F and the rotational angle θ at the time of returning the accelerator pedal 28 toward the accelerator-full-closing position) is smaller than the pedal force F at the time of depressing the accelerator pedal 28 (see the solid line S1, which indicates the relationship between the pedal force F and the rotational angle θ at the time of depressing the accelerator pedal 28) even for the same rotational angle θ. In the accelerator apparatus 1 of the first embodiment, the first rib 321, the second rib 326, the third rib 151, the fourth rib 156, the fifth rib 171 and the sixth rib 176 form a labyrinth structure in the communication passage 111. Thereby, a path of the flow of the air, which passes the communication passage 111, becomes a meander path rather than a smooth arcuate path extending along the other peripheral wall of the pedal boss portion 32. Thus, the flow of the air from the exterior space into the interior space 11 is limited, and thereby the amount of foreign objects, which enter the interior space 11, can be reduced or minimized.

Each of the surface 323, the surface 153 and the surface 158 defines the corresponding acute angle relative to the first imaginary line C1. Furthermore, each of the surface 328, the surface 173 and the surface 178 defines the corresponding acute angle relative to the second imaginary line C2. Here, the first imaginary line C1 can be considered as the flow of the air, which flows through the gap between the first outer wall 320 and the inner wall 150. Furthermore, the second imaginary line C2 can be considered as the flow of the air, which flows through the gap between the second outer wall 325 and the inner wall 170. That is, each of the first rib 321, the second rib 326, the third rib 151, the fourth rib 156, the fifth rib 171 and the sixth rib 176 extends at the corresponding acute angle relative to the flow of the air, which flows from the exterior space into the interior space 11. Thus, the flow of the air from the exterior space into the interior space 11 is limited, and thereby the intrusion of the foreign objects, which enter the interior space 11 along with the air supplied from the exterior space into the interior space 11, is limited. Therefore, in the accelerator apparatus 1 of the first embodiment, it is possible to reduce or minimize the amount of foreign objects, which enter the interior space 11.

Furthermore, each of the surface 322, the surface 152 and the surface 157 defines the corresponding obtuse angle relative to the first imaginary line C1. Furthermore, each of the surface 327, the surface 172 and the surface 177 defines the corresponding obtuse angle relative to the second imaginary line C2. Thus, the flow of the air from the interior space 11 to the exterior space is promoted, and thereby the foreign objects, which are present in the interior space 11, can be easily discharged to the exterior space.

Therefore, in the accelerator apparatus 1 of the first embodiment, it is possible to reduce the amount of foreign objects, which are present in the interior space 11.

Furthermore, in the labyrinth structure, which is formed by the first rib 321, the third rib 151 and the fourth rib 156, the flow of the air from the interior space 11 to the exterior space is directed from the upper side to the lower side in the direction of gravity. Therefore, the foreign objects, which are present in the interior space 11, are expelled by the gravity toward the exterior space through the labyrinth structure, which is formed by the first rib 321, the third rib 151 and the fourth rib 156. As a result, the foreign objects, which are present in the interior space 11, can be easily expelled to the exterior space.

Furthermore, the lower side of the pedal boss portion 32 is not covered with the support member 10 and is thereby exposed to the exterior space of the support member 10. Here, the fourth rib 156, which is formed in the inner wall 150, is located on the upper side of the lower portion of the pedal boss portion 32. Thereby, the foreign objects, which are expelled from the interior space 11 to the exterior space through the gap between the first outer wall 320 and the inner wall 150, are expelled from the communication passage 111 without being retained at the lower portion of the inner wall 150. As a result, the foreign objects, which are present in the interior space 11, can be easily expelled to the exterior space.

Furthermore, in the accelerator apparatus 1 of the first embodiment, the labyrinth structure is formed by the rib 135 and the rib 185, each of which is formed to cover the corresponding peripheral edge part of the pedal boss portion 32. Thereby, it is possible to limit intrusion of foreign objects through a gap between a side wall (serving as a first side wall) 324 of the pedal boss portion 32, which extends in a direction perpendicular to the rotational axis of the shaft 20, and the inner wall 180 of the second cover 18. Also, it is possible to limit intrusion of foreign objects through a gap between a side wall (serving as a second side wall) 329 of the pedal boss portion 32, which extends in a direction perpendicular to the rotational axis of the shaft 20, and the inner wall 130 of the bearing segment 13. As a result, the amount of foreign objects, which enter the interior space 11, can be reduced or minimized.

(Second Embodiment)

Next, an accelerator apparatus according to a second embodiment of the present disclosure will be described with reference to FIGS. 10 to 12. The second embodiment differs from the first embodiment with respect to the configurations of the ribs formed in the pedal boss portion, the rear segment and the front segment of the support member. In the following description, components, which are similar to those of the first embodiment, will be indicated by the same reference numerals and will not be described further.

Figure 10:
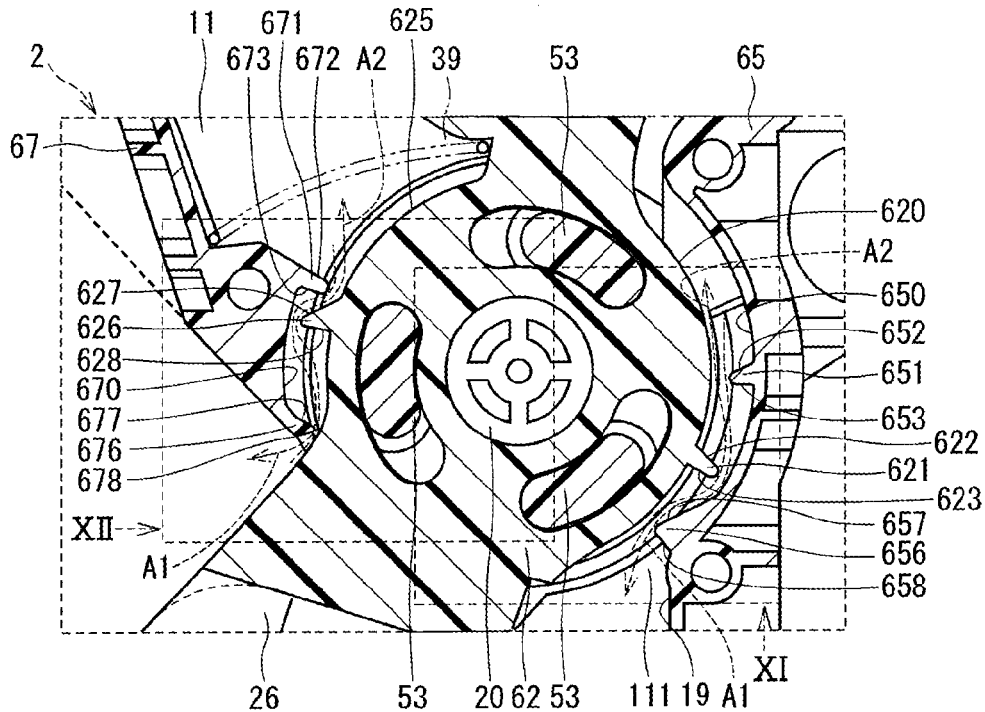
FIG. 10 is a partial enlarged cross-sectional view showing an accelerator apparatus according to a second embodiment of the present disclosure.
Figure 11:
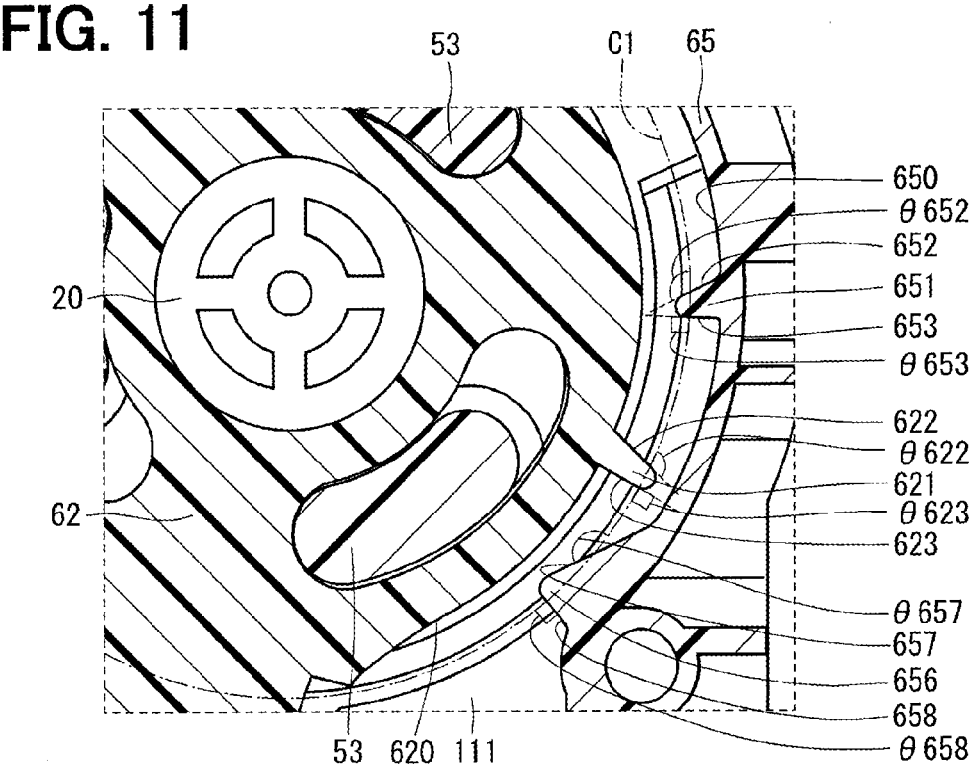
FIG. 11 is a partial enlarged view of an area XI in FIG. 10.

In the accelerator apparatus 2 of the second embodiment, as shown in FIG. 10, a first rib 621, which serves as a first projection, is formed in a first outer wall 620 of a pedal boss portion 62. A second rib 626, which serves as a second projection, is formed in a second outer wall 625 of the pedal boss portion 62. As shown in FIG. 11, the first rib 621 has a surface 622 on the interior space 11 side in the circumferential direction. An angle θ622, which is defined between the surface 622 of the first rib 621 and the first imaginary line C1 (or a tangent line that is tangent to the first imaginary line C1 at an intersecting point of the first imaginary line C1 with the surface 622 or an imaginary extension surface of the surface 622) on the radially outer side of the first imaginary line C1, is an obtuse angle. Furthermore, the first rib 621 has a surface 623 on the exterior space side in the circumferential direction. An angle θ623, which is defined between the surface 623 of the first rib 621 and the first imaginary line C1 (or a tangent line that is tangent to the first imaginary line C1 at an intersecting point of the first imaginary line C1 with the surface 623 or an imaginary extension surface of the surface 623) on the radially outer side of the first imaginary line C1 is generally a right angle. The surface 623 serves as a first exterior side surface of the present disclosure. The surface 622 serves as a first interior side surface of the present disclosure.

Figure 12:
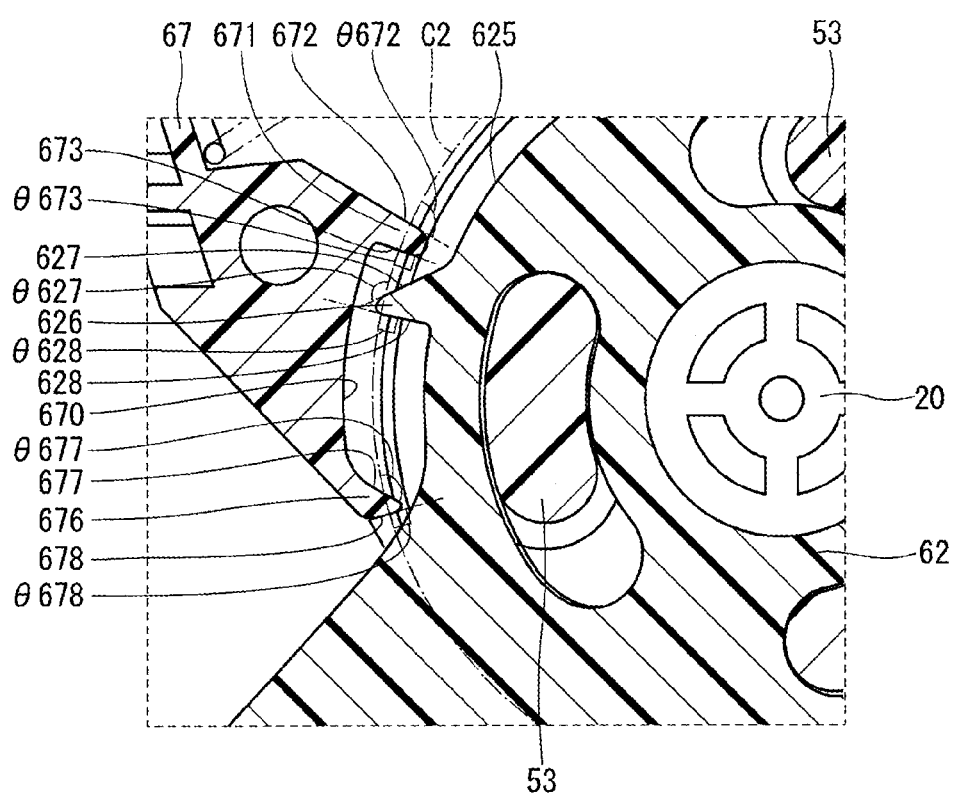
FIG. 12 is a partial enlarged view of an area XII in FIG. 10.

Furthermore, as shown in FIG. 12, the second rib 626 has a surface 627 on the interior space 11 side in the circumferential direction. An angle θ627, which is defined between the surface 627 of the second rib 626 and the second imaginary line C2 (or a tangent line that is tangent to the second imaginary line C2 at an intersecting point of the second imaginary line C2 with the surface 627 or an imaginary extension surface of the surface 627) on the radially outer side of the second imaginary line C2, is an obtuse angle. Furthermore, the second rib 626 has a surface 628 on the exterior space side in the circumferential direction. An angle θ628, which is defined between the surface 628 of the second rib 626 and the second imaginary line C2 (or a tangent line that is tangent to the second imaginary line C2 at an intersecting point of the second imaginary line C2 with the surface 628 or an imaginary extension surface of the surface 628) on the radially outer side of the second imaginary line C2 is generally a right angle. In FIG. 12, the imaginary extension surface of the surface 627 and the imaginary extension surface of the surface 628 are indicated by a dotted line for the purpose of indicating the angle θ627 between the surface 627 and the second imaginary line C2 and the angle θ628 between the surface 628 and the second imaginary line C2. The surface 628 serves as a second exterior side surface of the present disclosure. The surface 627 serves as a second interior side surface of the present disclosure.

The third rib 651 and the fourth rib 656 are formed in an inner wall 650 of the rear segment 65, which serves as a first inner wall. As shown in FIG. 11, the third rib 651 has a surface 652, which is located on the interior space 11 side in the circumferential direction. An angle θ652, which is defined between the surface 652 of the third rib 651 and the first imaginary line C1 (or a tangent line that is tangent to the first imaginary line C1 at an intersecting point of the first imaginary line C1 with the surface 652 or an imaginary extension surface of the surface 652) on the radially inner side of the first imaginary line C1, is an obtuse angle. Furthermore, the fourth rib 656 has a surface 657, which is located on the interior space 11 side in the circumferential direction. An angle θ657, which is defined between the surface 657 of the fourth rib 656 and the first imaginary line C1 (or a tangent line that is tangent to the first imaginary line C1 at an intersecting point of the first imaginary line C1 with the surface 657 or an imaginary extension surface of the surface 657) on the radially inner side of the first imaginary line C1, is an obtuse angle. The third rib 651 has a surface 653, which is located on the exterior space side in the circumferential direction. An angle θ653, which is defined between the surface 653 of the third rib 651 and the first imaginary line C1 (or a tangent line that is tangent to the first imaginary line C1 at an intersecting point of the first imaginary line C1 with the surface 653 or an imaginary extension surface of the surface 653) on the radially inner side of the first imaginary line C1, is generally a right angle. The fourth rib 656 has a surface 658, which is located on the exterior space side in the circumferential direction. An angle θ658, which is defined between the surface 658 of the fourth rib 656 and the first imaginary line C1 (or a tangent line that is tangent to the first imaginary line C1 at an intersecting point of the first imaginary line C1 with the surface 658 or an imaginary extension surface of the surface 658) on the radially inner side of the first imaginary line C1, is generally a right angle. In FIG. 11, the imaginary extension surface of the surface 652 and the imaginary extension surface of the surface 653 are indicated by a dotted line for the purpose of indicating the angle θ652 between the surface 652 and the first imaginary line C1 and the angle θ653 between the surface 653 and the first imaginary line C1. The third rib 651 serves as a projection of the first inner wall or a third projection of the present disclosure. The fourth rib 656 serves as a projection of the first inner wall or a fourth projection of the present disclosure. Each of the surface 653 and the surface 658 serves as a third exterior side surface of the present disclosure. Each of the surface 652 and the surface 657 serves as a third interior side surface of the present disclosure.

A fifth rib 671 and a sixth rib 676 are formed in an inner wall 670 of the front segment 67, which serves as a second inner wall. As shown in FIG. 12, the fifth rib 671 has a surface 672, which is located on the interior space 11 side in the circumferential direction. An angle θ671, which is defined between the surface 671 of the fifth rib 671 and the second imaginary line C2 (or a tangent line that is tangent to the second imaginary line C2 at an intersecting point of the second imaginary line C2 with the surface 671 or an imaginary extension surface of the surface 671) on the radially inner side of the second imaginary line C2, is an obtuse angle. Furthermore, the sixth rib 676 has a surface 677, which is located on the interior space 11 side in the circumferential direction. An angle θ677, which is defined between the surface 677 of the sixth rib 676 and the second imaginary line C2 (or a tangent line that is tangent to the second imaginary line C2 at an intersecting point of the second imaginary line C2 with the surface 677 or an imaginary extension surface of the surface 677) on the radially inner side of the second imaginary line C2, is an obtuse angle. The fifth rib 671 has a surface 673, which is located on the exterior space side in the circumferential direction. An angle θ673, which is defined between the surface 673 of the fifth rib 671 and the second imaginary line C2 (or a tangent line that is tangent to the second imaginary line C2 at an intersecting point of the second imaginary line C2 with the surface 673 or an imaginary extension surface of the surface 673) on the radially inner side of the second imaginary line C2, is generally a right angle. The sixth rib 676 has a surface 678, which is located on the exterior space side in the circumferential direction. An angle θ678, which is defined between the surface 678 of the sixth rib 676 and the second imaginary line C2 (or a tangent line that is tangent to the second imaginary line C2 at an intersecting point of the second imaginary line C2 with the surface 678 or an imaginary extension surface of the surface 678) on the radially inner side of the second imaginary line C2, is generally a right angle. In FIG. 12, the imaginary extension surface of the surface 672, the imaginary extension surface of the surface 673 and the imaginary extension surface of the surface 678 are indicated by a dotted line for the purpose of indicating the angle θ672 between the surface 672 and the second imaginary line C2, the angle θ673 between the surface 673 and the second imaginary line C2 and the angle θ678 between the surface 678 and the second imaginary line C2. The fifth rib 671 serves as a projection of the second inner wall or a fifth projection of the present disclosure. The sixth rib 676 serves as a projection of the second inner wall or a sixth projection of the present disclosure. Each of the surface 673 and the surface 678 serves as a fifth exterior side surface of the present disclosure. Each of the surface 672 and the surface 677 serves as a fifth interior side surface of the present disclosure.

In the accelerator apparatus 2 of the second embodiment, each of the angle θ623 defined between the surface 623 and the first imaginary line C1, the angle θ653 between the surface 653 and the first imaginary line C1 and the angle θ658 between the surface 658 and the first imaginary line C1 is generally the right angle. Furthermore, each of the angle θ628 between the surface 628 and the second imaginary line C2, the angle θ673 between the surface 673 and the second imaginary line C2 and the angle θ678 between the surface 678 and the second imaginary line C2 is generally the right angle. In this way, it is possible to limit the intrusion of the foreign objects from the exterior space into the interior space 11 along with the flow of the air. Therefore, in the accelerator apparatus 2 of the second embodiment, it is possible achieve advantages, which are similar to those of the accelerator apparatus 1 of the first embodiment.

(Third Embodiment)

Figure 13:
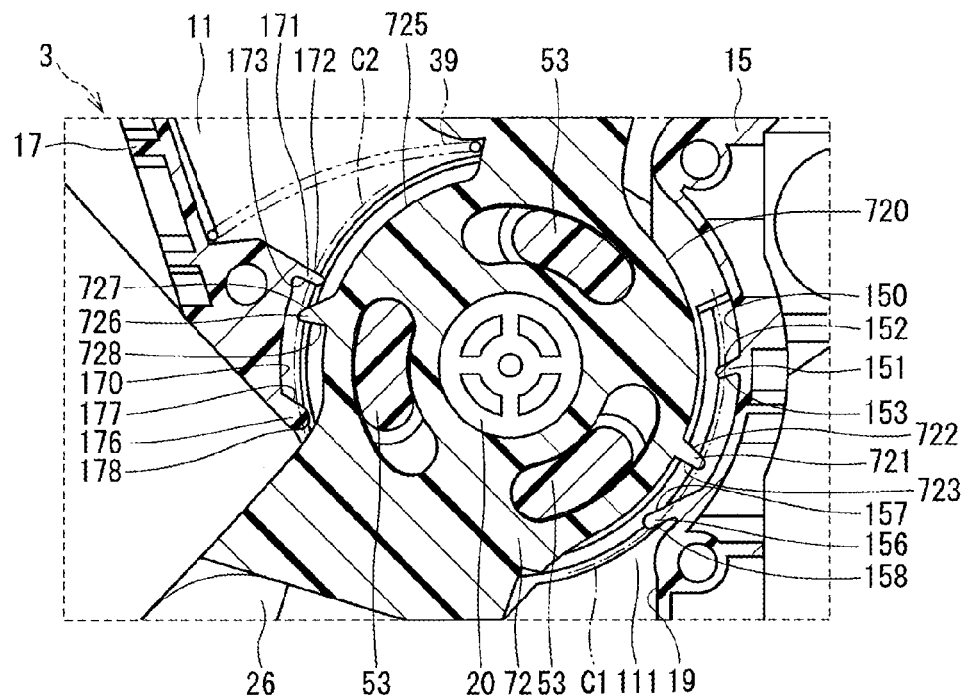
FIG. 13 is a partial enlarged cross-sectional view showing an accelerator apparatus according to a third embodiment of the present disclosure.

Next, an accelerator apparatus according to a third embodiment of the present disclosure will be described with reference to FIG. 13. The third embodiment differs from the first embodiment with respect to the configurations of the ribs formed in the pedal boss portion. In the following description, components, which are similar to those of the first embodiment, will be indicated by the same reference numerals and will not be described further.

In the accelerator apparatus 3 of the third embodiment, a first rib 721, which serves as first projection, is formed in a first outer wall 720 of a pedal boss portion 72. Furthermore, a second rib 726, which serves as a second projection, is formed in a second outer wall 725 of the pedal boss portion 72.

The first rib 721 has a surface 722, which is located on the interior space 11 side in the circumferential direction. An angle, which is defined between the surface 722 of the first rib 721 and the first imaginary line C1 (or a tangent line that is tangent to the first imaginary line C1 at an intersecting point of the first imaginary line C1 with the surface 722 or an imaginary extension surface of the surface 722) on the radially outer side of the first imaginary line C1, is an obtuse angle. The first rib 721 also has a surface 723, which is located on the exterior space side in the circumferential direction. An angle, which is defined between the surface 723 of the first rib 721 and the first imaginary line C1 (or a tangent line that is tangent to the first imaginary line C1 at an intersecting point of the first imaginary line C1 with the surface 723 or an imaginary extension surface of the surface 723) on the radially outer side of the first imaginary line C1, is generally a right angle. The surface 723 serves as a first exterior side surface of the present disclosure. The surface 722 serves as a first interior side surface of the present disclosure.

The second rib 726 has a surface 727, which is located on the interior space 11 side in the circumferential direction. An angle, which is defined between the surface 727 of the second rib 726 and the second imaginary line C2 (or a tangent line that is tangent to the second imaginary line C2 at an intersecting point of the second imaginary line C2 with the surface 727 or an imaginary extension surface of the surface 727) on the radially outer side of the second imaginary line C2, is an obtuse angle. The second rib 726 also has a surface 728, which is located on the exterior space side in the circumferential direction. An angle, which is defined between the surface 728 of the second rib 726 and the second imaginary line C2 (or a tangent line that is tangent to the second imaginary line C2 at an intersecting point of the second imaginary line C2 with the surface 728 or an imaginary extension surface of the surface 728) on the radially outer side of the second imaginary line C2, is generally a right angle. The surface 728 serves as a second exterior side surface of the present disclosure. The surface 727 serves as a second interior side surface of the present disclosure.

In the accelerator apparatus 3 of the third embodiment, the angle, which is defined between the surface 723 and the first imaginary line C1 on the radially inner side of the first imaginary line C1, is generally the right angle. Also, the angle, which is defined between the surface 728 and the second imaginary line C2 on the radially outer side of the second imaginary line C2, is generally the right angle. In this way, it is possible to limit the intrusion of the foreign objects from the exterior space into the interior space 11 along with the flow of the air. Therefore, in the accelerator apparatus 3 of the third embodiment, it is possible achieve advantages, which are similar to those of the accelerator apparatus 1 of the first embodiment.

(Fourth Embodiment)

Figure 14:
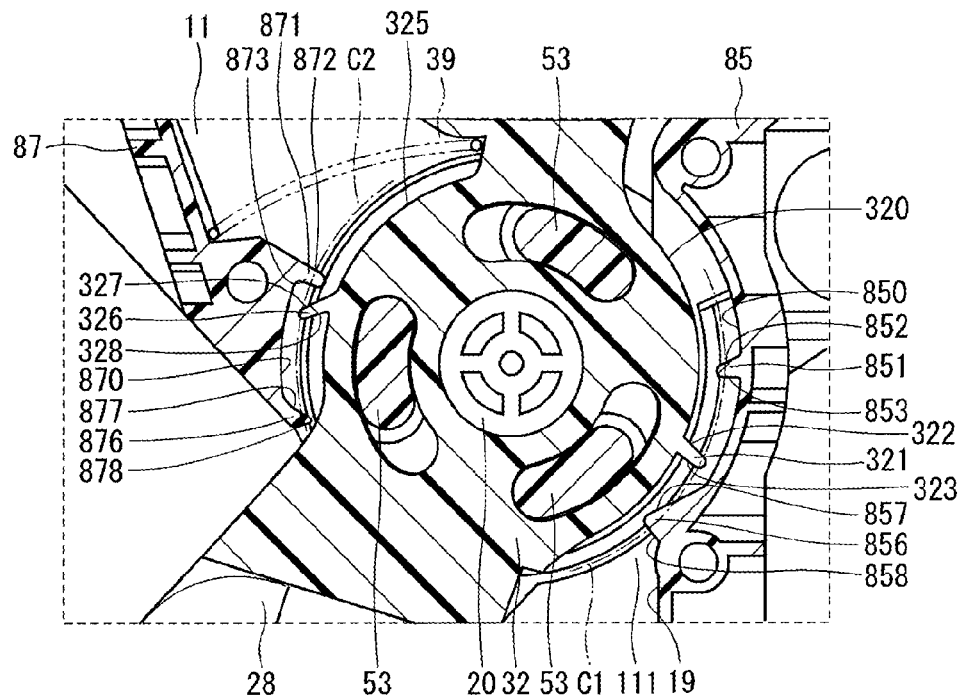
FIG. 14 is a partial enlarged cross-sectional view showing an accelerator apparatus according to a fourth embodiment of the present disclosure.

Next, an accelerator apparatus according to a fourth embodiment of the present disclosure will be described with reference to FIG. 14. The fourth embodiment differs from the first embodiment with respect to the configurations of the ribs formed in the rear segment and the front segment. In the following description, components, which are similar to those of the first embodiment, will be indicated by the same reference numerals and will not be described further.

A third rib 851 and a fourth rib 856 are formed in an inner wall 850 of the rear segment 85, which serves as a first inner wall. The third rib 851 has a surface 852 on the interior space 11 side in the circumferential direction. An angle, which is defined between the surface 852 of the third rib 851 and the first imaginary line C1 (or a tangent line that is tangent to the first imaginary line C1 at an intersecting point of the first imaginary line C1 with the surface 852 or an imaginary extension surface of the surface 852) on the radially inner side of the first imaginary line C1, is an obtuse angle. The fourth rib 856 has a surface 857 on the interior space 11 side in the circumferential direction. An angle, which is defined between the surface 857 of the fourth rib 856 and the first imaginary line C1 (or a tangent line that is tangent to the first imaginary line C1 at an intersecting point of the first imaginary line C1 with the surface 857 or an imaginary extension surface of the surface 857) on the radially inner side of the first imaginary line C1, is an obtuse angle. The third rib 851 also has a surface 853 on the exterior space side in the circumferential direction. An angle, which is defined between the surface 853 of the third rib 851 and the first imaginary line C1 (or a tangent line that is tangent to the first imaginary line C1 at an intersecting point of the first imaginary line C1 with the surface 853 or an imaginary extension surface of the surface 853) on the radially inner side of the first imaginary line C1, is generally a right angle. The fourth rib 856 also has a surface 858 on the exterior space side in the circumferential direction. An angle, which is defined between the surface 858 of the fourth rib 856 and the first imaginary line C1 (or a tangent line that is tangent to the first imaginary line C1 at an intersecting point of the first imaginary line C1 with the surface 858 or an imaginary extension surface of the surface 858) on the radially inner side of the first imaginary line C1, is generally a right angle. The third rib 851 serves as a projection of the first inner wall or a third projection of the present disclosure. The fourth rib 856 serves as a projection of the first inner wall or a fourth projection of the present disclosure. Each of the surface 853 and the surface 858 serves as a third exterior side surface of the present disclosure. Each of the surface 852 and the surface 857 serves as a third interior side surface of the present disclosure.

A fifth rib 871 and a sixth rib 876 are formed in an inner wall 870 of the front segment 87, which serves as a second inner wall. The fifth rib 871 has a surface 872 on the interior space 11 side in the circumferential direction. An angle, which is defined between the surface 872 of the fifth rib 871 and the second imaginary line C2 (or a tangent line that is tangent to the second imaginary line C2 at an intersecting point of the second imaginary line C2 with the surface 872) on the radially inner side of the second imaginary line C2, is an obtuse angle. The sixth rib 876 has a surface 877 on the interior space 11 side in the circumferential direction. An angle, which is defined between the surface 877 of the sixth rib 876 and the second imaginary line C2 (or a tangent line that is tangent to the second imaginary line C2 at an intersecting point of the second imaginary line C2 with the surface 877 or an imaginary extension surface of the surface 877) on the radially inner side of the second imaginary line C2, is an obtuse angle. The fifth rib 871 also has a surface 873 on the exterior space side in the circumferential direction. An angle, which is defined between the surface 873 of the fifth rib 871 and the second imaginary line C2 (or a tangent line that is tangent to the second imaginary line C2 at an intersecting point of the second imaginary line C2 with the surface 873 or an imaginary extension surface of the surface 873) on the radially inner side of the second imaginary line C2, is generally a right angle. The sixth rib 876 also has a surface 878 on the exterior space side in the circumferential direction. An angle, which is defined between the surface 878 of the sixth rib 876 and the second imaginary line C2 (or a tangent line that is tangent to the second imaginary line C2 at an intersecting point of the second imaginary line C2 with the surface 878 or an imaginary extension surface of the surface 878) on the radially inner side of the second imaginary line C2, is generally a right angle. The fifth rib 871 serves as a projection of the second inner wall or a fifth projection of the present disclosure. The sixth rib 876 serves as a projection of the second inner wall or a sixth projection of the present disclosure. Each of the surface 873 and the surface 878 serves as a fifth exterior side surface of the present disclosure. Each of the surface 872 and the surface 877 serves as a fifth interior side surface of the present disclosure.

In the accelerator apparatus 4 of the fourth embodiment, the angle, which is defined between each of the surface 853 and the surface 858 and the first imaginary line C1 on the radially inner side of the first imaginary line C1, is generally the right angle. Also, the angle, which is defined between each of the surface 873 and the surface 878 and the second imaginary line C2 on the radially inner side of the second imaginary line C2, is generally the right angle. In this way, it is possible to limit the intrusion of the foreign objects from the exterior space into the interior space 11 along with the flow of the air. Therefore, in the accelerator apparatus 4 of the fourth embodiment, it is possible achieve advantages, which are similar to those of the accelerator apparatus 1 of the first embodiment.

Now, modifications of the above embodiments will be described.

In the above embodiments, the number of ribs, which form the labyrinth structure and are provided in the support member, is four. However, the number of the ribs provided in the support member is not limited to this number. That is, it is only required to provide at least one rib in the support member. Thereby, the number of the ribs provided in the support member may be less than four but equal to or larger than 1 or may be larger than four.

The present invention is not limited to the above embodiments, and the above embodiments may be modified within the spirit and scope of the present invention.

What is claimed is:

1. An accelerator a apparatus for a vehicle, comprising:
a support member that is installable to a body of the vehicle;
a shaft that is rotatably supported by the support member;
a rotatable body that is rotatable integrally with the shaft, wherein the rotatable body has a boss portion, which is fixed to an outer wall of the shaft;
a pedal arm that is fixed to the rotatable body at one end portion of the pedal arm, wherein the other end portion of the pedal arm has a depressible portion that is depressible by a driver;
a rotational angle sensing device that is received in an interior space of the support member and sense a rotational angle of the shaft relative to the support member; and
an urging device that is received in the interior space of the support member and urges the shaft in an accelerator-closing direction wherein:
the support member has a communication passage, which receives the boss portion and communicates between the interior space of the support member and an exterior space the support member;
an outer wall of the boss portion, which is parallel to a rotational axis of the shaft, includes a first outer wall, which is located in one circumferential side of the boss portion in an accelerator-opening direction, and the first outer wall has a first projection that projects toward a first inner wall of the support member, which is located adjacent to the first outer wall and forms the communication passage;
the outer wall of the boss portion, which is parallel to the rotational axis of the shaft, includes a second outer wall, which is located in another circumferential side of the boss portion in the accelerator-closing and the second outer wall has a second projection that projects toward a second inner wall of the support member, which is located adjacent to the second outer wall and forms the communication passage;
the first inner wall has at least one projection, which projects toward the first outer wall; and
the second inner wall has at least one projection, which projects toward the second outer wall;
the first projection has a first exterior side surface, which is located on an exterior space side of the support member where an exterior space of the support member is located;
an angle, which is defined between the first exterior side surface of the first projection and a first imaginary line that is spaced from the first outer wall of the boss portion by a predetermined distance on a radially outer side of the first outer wall, is one of an acute angle and a right angle;
the second projection has a second exterior side surface, which is located on the exterior space side of the support member; and
an angle, which is defined between the second exterior side surface of the second projection and a second imaginary line that is spaced from the second outer wall of the boss portion by a predetermined distance on a radially outer side of the second outer wall, is one of an acute angle and a right angle.

2. The accelerator apparatus according to claim 1, wherein a lower side of the boss portion, which is located on a lower side in a direction of gravity, is exposed to the exterior space of the support member.

3. An accelerator apparatus for a vehicle, comprising:
a support member that is installable to a body of the vehicle;
a shall that is rotatably supported by the support member;
a rotatable body that is rotatable integrally with the shaft, wherein the rotatable body has a boss portion, which is fixed to an outer wall of the shaft;
a pedal arm that is fixed to the rotatable body at one end portion of the pedal arm, wherein the other end portion of the pedal arm has a depressible portion that is depressible by a driver;
a rotational angle sensing device that is received in an interior space of the support member and senses a rotational an le of the shaft relative to the support member; and
an urging device that is received in the interior space of the support member and urges the shaft in an accelerator-closing direction, wherein:
the support member has a communication passage, which receives the boss portion and communicates between the interior space of the support member and an exterior space of the support member;
an outer wall of the boss portion which is parallel to a rotational axis of the shaft, includes a first outer wall which is located in one circumferential side of the boss portion in an accelerator-opening direction, and the first outer wall has a first projection that projects toward a first inner wall of the support member, which is located adjacent to the first outer wall and forms the communication passage;
the outer wall of the boss portion, which is parallel to the rotational axis of the shaft, includes a second outer wall, which is located in another circumferential side of the boss portion in the accelerator-closing direction, and the second outer wall has a second projection that projects toward a second inner wall of the support member, which is located adjacent to the second outer wall and forms the communication passage;
the first inner wall has at least one projection, which projects toward the first outer wall; and
the second inner wall has at least one projection which projects toward the second outer wall;
the at least one projection of the first inner wall has a first exterior side surface, which is located on the exterior space side of the support member;
an angle, which is defined between the first exterior side surface of the at least one projection of the first inner wall and a first imaginary line that is spaced from the first outer wall of the boss portion by a predetermined distance on a radially outer side of the first outer wall, is one of an acute angle and a right angle;
the at least one projection of the second inner wall has a second exterior side surface, which is located on the exterior space side of the support member; and
an angle, which is defined between the second exterior side surface of the at least one projection of the second inner wall and a second imaginary line that is spaced from the second outer wall of the boss portion by a predetermined distance on a radially outer side of the second outer wall, is one of an acute angle and a right angle.

4. The accelerator apparatus according to claim 3, wherein a lower side of the boss portion, which is located on a lower side in a direction of gravity, is exposed to the exterior space of the support member.

5. An accelerator apparatus for vehicle, comprising:
a support member that is installable to a body Of the vehicle;
a shaft that is rotatably supported by the support member;
a rotatable body that is rotatable integrally with the shaft, wherein able body has a boss portion, which is fixed to an outer wall of the shaft;
a pedal arm that is fixed, to the rotatable body at one end portion of the pedal arm, wherein the other end portion of the pedal arm has a depressible portion that is depressible by a driver;
a rotational angle sensing device that is received in an interior space of the support member sense a rotational angle of the shaft relative to the support member; and
an urging device that is received in the interior space of the support member and urges the shaft in an accelerator-closing direction, wherein:
the support member has a communication passage, which receives the boss portion and communicates between the interior space of the support member and an exterior space of the support member;
an outer wall of the boss portion which is parallel to a rotational axis of the shaft, includes a first outer wall, which is located in one circumferential side of the boss portion in an accelerator-opening direction, and the first outer wall has a first projection that projects toward a first inner wall of the support member, which is located adjacent to the first outer wall and forms the communication passage;
the outer wall of the boss portion, which is parallel to the rotational axis of the shaft, includes a second outer wall which is located in another circumferential side of the boss portion in the accelerator-closing direction, and the second outer wall has a second projection that projects toward a second inner wall of the support member which is located adjacent to the second outer wall and forms the communication passage;
the first inner wall has at least one projection, which projects toward the first outer wall; and
the second inner wall has at least one projection, which projects toward the second outer wall;
the first projection has a first interior side surface, which is located on an interior space side of the support member where the interior space of the support member is located;
an angle, which is defined between the first interior side surface of the first projection and a first imaginary line that is spaced from the first outer wall of the boss portion by a predetermined distance on a radially outer side of the first outer wall, is an obtuse angle;
the second projection has a second interior side surface, which is located on the interior space side of the support member; and
an angle, which is defined between the second interior side surface of the second projection and a second imaginary line that is spaced from the second outer wall of the boss portion by a predetermined distance on a radially outer side of the second outer wall, is an obtuse angle.

6. The accelerator apparatus according to claim 5, wherein a lower side of the boss portion, which is located on a lower side in a direction of gravity, is exposed to the exterior space of the support member.

7. An accelerator apparatus for a vehicle comprising:
support member that is installable to a body of the vehicle;
a shaft that is rotatably supported by the support member:
a rotatable body that is rotatable integrally with the shaft, wherein the rotatable body has a boss portion, which is fixed to an outer wall, of the shaft;
a pedal arm that is fixed to the rotatable body at one end portion of the pedal arm, wherein the other end portion of the pedal arm has a depressible portion that is depressible by a driver,
a rotational angle sensing device that is received in an interior space of the support member and senses a rotational angle of the shaft relative to the support member; and
an urging device that is received in the interior space of the support member and urges the shall in an accelerator-closing direction, wherein;
the support member has a communication passage, which receives the boss portion and communicates between the interior space of the support: member and an exterior space of the support member;
an outer wall of the boss portion, which is parallel to a rotational axis of the shaft, includes a first outer wall, which is located in one circumferential side of the boss portion in an accelerator-opening direction, and the first outer wall has a first projection that projects toward a first inner wall of the support member, which is located adjacent to the first outer wall and forms the communication passage;
the outer wall of the boss portion, which is parallel to the rotational axis of the shaft, includes a second outer wall, which is located in another circumferential side of the boss portion in accelerator-closing direction, and the second outer wall has a second projection that projects toward a second inner wall of the support member, which is located adjacent to the second outer wall and forms the communication passage;
the first inner wall has at least one projection, which projects toward the first outer wall; and
the second inner wall has at least one projection, which projects toward the second o wall;
the at least one projection of the first inner wall has a first interior side surface, which is located on the interior space side of the support member;
an angle, which is defined between the first interior side surface of the at least one projection of the first inner wall and a first imaginary line that is spaced from the first outer wall of the boss portion by a predetermined distance on a radially outer side of the first outer wall, is an obtuse angle;
the at least one projection of the second inner wall has a second interior side surface, which is located on the interior space side of the support member; and
an angle, which is defined between the second interior side surface of the at least one projection of the second inner wall and a second imaginary line that is spaced from the second outer wall of the boss portion by a predetermined distance on a radially outer side of the second outer wall, is an obtuse angle.

8. The accelerator apparatus according to claim 7, wherein a lower side of the boss portion, which is located on a lower side in a direction of gravity, is exposed to the exterior space of the support member.

9. An accelerator apparatus for a vehicle, comprising:
a support member that is installable to a body of the vehicle;
a shaft that rotatably supported by the support member;
a rotatable body that is rotatable integrally with the shaft, wherein the rotatable body has a boss portion, which is fixed to an outer wall of the shaft;
a pedal arm that is fixed to the rotatable body at one end portion of the pedal arm, wherein the other end portion of the pedal arm has a depressible portion that is depressible by a driver;
a rotational angle sensing device that is received in an interior space of the support member and senses a rotational an angle of the shaft relative to the support member; and
an urging device that is received in the interior space of the support member and urges the shaft in an accelerator-closing direction, wherein:
the support member has a communication passage, which receives the boss portion and communicates between the interior space of the support member and an exterior space of the support member;
an outer wall of the boss portion, which is parallel to a rotational axis of the shaft, includes a first outer wall, which is located in one circumferential side of the boss portion in an accelerator-opening direction, and the first outer wall has a first projection that projects toward a first inner wall of the support member, which is located adjacent to the first outer wall and forms the communication passage;
the outer wall of the boss portion, which parallel to the rotational axis of the shaft includes a second outer wall, which is located in another circumferential side of the boss portion in the accelerator-closing direction and the second outer wall has a second projection that projects toward a second inner wall of the support member, which is located adjacent to the second outer wall and forms the communication passage;
the first inner wall has at least one projection, which projects toward the first outer wall; and
the second inner wall has at least one projection, which projects toward the second outer wall;
a length of the first projection measured in a direction of the rotational axis, a length of the second projection measured in the direction of the rotational axis, a length of the at least one projection of the first inner wall measured in the direction of the rotational axis and a length of the at least one projection of the second inner wall measured in the direction of the rotational axis are generally the same as a length of the boss portion measured in the direction of the rotational axis.

10. The accelerator apparatus according to claim 9, wherein a lower side of the boss portion, which is located on a lower side in a direction of gravity, is exposed to the exterior space of the support member.

11. An accelerator apparatus for a vehicle, comprising;
a support member that is installable to a body of the vehicle;
a shaft that is rotatably supported by the support member;
a rotatable body that is rotatable integrally with the shaft, wherein rotatable body has a boss portion, which is fixed to an outer wall of the shaft
a pedal arm that is fixed to the rotatable body at one end portion of the pedal arm wherein the other end portion of the pedal arm has a depressible portion that is depressible by a driver;
a rotational angle sensing device that is received in an interior space of the support member and senses a rotational angle of the shaft relative to the support member; and
an urging device that is received in the interior space of the support member and urges the shaft in an accelerator-closing direction, wherein:
the support member has a communication passage, which receives the boss portion and communicates between the interior space of the support member and an exterior space of the support member;
an outer wall of the boss portion, which is parallel to a rotational axis of the shaft, includes a first outer wall, which is located en one circumferential side of the boss portion in an accelerator-opening direction, and the first outer wall has a first projection that projects toward a first inner wall of the support member, which is located adjacent to the first outer wall and forms the communication passage;
the outer wall of the boss portion, which parallel to the rotational axis of the shaft, includes a second outer wall, which is located in another circumferential side of the boss portion in the accelerator-closing direction, and the second Outer wall has a second projection that projects toward a second inner wall of the support member, which is located adjacent to the second outer wall and forms the communication passage;
the first inner wall has at least one projection, which projects towards the first outer wall; and
the second inner wall has at least one projection, which projects toward the second outer wall;
the at least one projection of the first inner wall includes:
a third projection that is located on a side of the first projection that is the interior space side of the support member; and
a fourth projection that is located on a side of the first projection that is the exterior space side of the support member.

12. The accelerator apparatus according to claim 11, wherein a lower side of the boss portion, which is located on a lower side in a direction of gravity, is exposed to the exterior space of the support member.

13. An accelerator apparatus for a vehicle, comprising:
a support member that is installable to a body of the vehicle;
a shaft that is rotatably supported by the support member;
a rotatable body that is rotatable integrally with the shaft, wherein the rotatable body has a boss portion, which is fixed to an outer wall of the shaft;
a pedal arm that is fixed to the rotatable body at one end portion of the pedal arm, wherein the other end portion of the pedal arm has a depressible portion that is depressible by a driver,
a rotational angle sensing device that is received in an interior space of the support member and senses a rotational angle of the shaft relative to the support member; and
an urging device that is received in the interior space of the support member and urges the shaft in an accelerator-closing direction, wherein:
the support member has a communication passage, which receives the boss portion and communicates between the interior space of the support member and an exterior space of the support member;
an outer wall of the boss portion which is parallel to a rotational axis of the shaft, includes a first outer wall, which is located in one circumferential side of the boss portion in an accelerator-opening direction, and the first outer wall has a first projection that projects toward a first inner wall of the support member, which is located adjacent to the first outer wall and forms the communication passage;

the outer wall of the boss portion, which is parallel to the rotational axis of the shaft, includes a second outer wall which is located in another circumferential side of the boss portion in the accelerator-closing direction, and the second outer wall has a second projection that projects toward a second inner wall of the support member, which located adjacent to the second outer wall and forms the communication passage;

the first inner wall has at least one projection, which projects toward the first outer wall; and the second inner wall has at least one projection, which projects toward the second outer wall;

the at least one projection of the second inner wall includes:

a third projection that is located on a side of the second projection that is the interior space side of the support member; and a fourth projection that is located on a side of the second projection that is the exterior space side of the support member.

14. The accelerator apparatus according to claim 13, wherein a lower side of the boss portion, which is located on a lower side in a direction of gravity, is exposed to the exterior space of the support member.

15. An accelerator apparatus for a vehicle, comprising:

a support member that is installable to a body of the vehicle a shaft that is rotatably supported by the support member;

a rotatable body that is rotatable integrally with the shaft, wherein the rotatable body has a boss portion, which is fixed to an outer wall of the shaft;

a pedal arm that is fixed to the rotatable body at one end portion of the pedal arm, wherein the other end portion of the pedal arm has a depressible portion that is depressible by a driver;

a rotational angle sensing device that is received in an interior space of the support member and senses a rotational angle of the shaft relative to the support member; and an urging device that is received in the interior space of the support member and urges the shaft in an accelerator-closing direction, wherein:

the support member has a communication passage, which receives the boss portion and communicates between the interior space of the support member and an exterior space of the support member;

an outer wall of the boss portion, which is parallel to rotational axis of the shaft includes a first outer wall, which is located in one circumferential side of the boss portion in an accelerator-opening direction, and the first outer wall has a first projection that projects toward a first inner wall of the support member, which is located adjacent to the first outer wall and forms the communication passage;

the outer wall of the boss portion, which is parallel to the rotational axis of the shaft, includes a second outer wall, which is located in another circumferential side of the boss portion in the accelerator-closing direction, and the second outer wall has a second projection that projects toward a second :inner wall of the support member, which is located adjacent to the second outer wall and forms the communication passage;

the first inner wall has at least one projection, which projects toward the first outer wall; and the second inner wall has at least one projection, which project the toward the second outer wall;

the outer wall of the boss portion includes a first side wall and a second side wall, which are generally perpendicular to the rotational axis of the shaft and are axially opposed to each other;

the support member includes:

a third inner wall that forms the communication passage and is generally parallel to the first side wall of the boss portion; and a fourth inner wall that forms the communication passage and is generally parallel to the second side wall of the boss portion;

a third projection is formed in the third inner wall of the support member to cover a peripheral edge part of the first side wall; and an fourth projection is formed in the fourth inner wall of the support member to cover a peripheral edge part of the second side wall.

16. The accelerator apparatus according to claim 15, wherein a lower side of the boss portion, which is located on a lower side in a direction of gravity, is exposed to the exterior space of the support member.

* * * * *